(12) United States Patent
Buckwalter et al.

(10) Patent No.: US 10,755,348 B2
(45) Date of Patent: Aug. 25, 2020

(54) USING PSYCHOMETRIC ANALYSIS FOR DETERMINING CREDIT RISK

(71) Applicant: Payoff, Inc., Costa Mesa, MA (US)

(72) Inventors: John Galen Buckwalter, Sierra Madre, CA (US); David Herman, Newport Beach, CA (US); Andrew Wen, Palo Alto, CA (US); Scott Saunders, Laguna Beach, CA (US)

(73) Assignee: Happy Money, Inc., Tustin, CA (US)

( * ) Notice: Subject to any disclaimer, the term of this patent is extended or adjusted under 35 U.S.C. 154(b) by 0 days.

(21) Appl. No.: 15/704,586

(22) Filed: Sep. 14, 2017

(65) Prior Publication Data
US 2018/0253793 A1 Sep. 6, 2018

Related U.S. Application Data

(63) Continuation of application No. 14/577,866, filed on Dec. 19, 2014.

(51) Int. Cl.
*G06Q 40/02* (2012.01)

(52) U.S. Cl.
CPC .................. *G06Q 40/025* (2013.01)

(58) Field of Classification Search
CPC .... G06Q 30/0282; G06Q 40/06; G06Q 40/25; G06F 9/453
See application file for complete search history.

(56) References Cited

U.S. PATENT DOCUMENTS

| 5,124,911 | A | 6/1992 | Sack |
| 6,658,391 | B1 | 12/2003 | Williams et al. |
| 7,870,047 | B2 * | 1/2011 | Mojsilovic ............. G06Q 40/00 705/35 |
| 7,874,841 | B1 | 1/2011 | Lycas |
| 8,224,732 | B1 * | 7/2012 | Mahoney ............... G06Q 40/06 705/35 |
| 10,181,158 | B2 * | 1/2019 | Oberlechner ...... G06Q 30/0282 |
| 2005/0022034 | A1 | 1/2005 | Chaudhari et al. |
| 2005/0125715 | A1 | 6/2005 | Franco et al. |
| 2005/0278245 | A1 | 12/2005 | Celati |
| 2006/0282306 | A1 | 12/2006 | Thissen-Roe |

(Continued)

FOREIGN PATENT DOCUMENTS

KR 20160149990 * 12/2016 ............. G06Q 40/25

OTHER PUBLICATIONS

De Bondt et al., "Financial decision-making in markets and firms: a behavioral perspective" (1994).*
Non-Final Office Action issued in counterpart U.S. Appl. No. 14/577,866 dated Mar. 24, 2017.
Non-Final Office Action issued in counterpart U.S. Appl. No. 14/577,866 dated Dec. 15, 2017.

(Continued)

*Primary Examiner* — Daniel S Felten
(74) *Attorney, Agent, or Firm* — Alford Law Group, Inc.; William E. Alford; Andy Pho

(57) ABSTRACT

A method of obtaining psychometric information about a user is disclosed. A psychometric graphical object is provided to the user by a personalized user management module. User interaction with the psychometric graphical object is measured by a psychological traits evaluation module. At least a first wider portion of the psychometric graphical object is labeled with a first keyword related to a psychological trait. At least a second wider portion of the psychometric graphical object is labeled with a second keyword related to the psychological trait.

23 Claims, 25 Drawing Sheets

(56) References Cited

U.S. PATENT DOCUMENTS

| | | |
|---|---|---|
| 2007/0048706 A1 | 3/2007 | Tan |
| 2008/0263014 A1 | 10/2008 | Garijo Mazario et al. |
| 2008/0300960 A1 | 12/2008 | Williams |
| 2009/0157630 A1 | 6/2009 | Yuan |
| 2010/0076912 A1 | 3/2010 | Carrabis |
| 2010/0115610 A1 | 5/2010 | Tredoux et al. |
| 2011/0251978 A1 | 10/2011 | Davies et al. |
| 2012/0072334 A1 | 3/2012 | Feinstein et al. |
| 2013/0282743 A1* | 10/2013 | Barhate ............. G06F 17/30345 707/756 |
| 2014/0018940 A1* | 1/2014 | Casilli .................... G05B 15/02 700/29 |
| 2014/0365355 A1 | 12/2014 | Shvarts |
| 2015/0033161 A1 | 1/2015 | Lawson et al. |
| 2016/0170609 A1 | 6/2016 | Bertram et al. |
| 2016/0171609 A1* | 6/2016 | Oberlechner ...... G06Q 30/0282 705/36 R |
| 2018/0336048 A1* | 11/2018 | Zarlengo ................. G06F 9/453 |

OTHER PUBLICATIONS

Final Office Action issued in counterpart U.S. Appl. No. 14/577,866 dated May 4, 2018.

D, Stout, (Apr. 28, 2003), Five Factor Constellations and Popular Personality Types, Leland R. Beaumont Psychology, 106.

E. Schafer, (May 2009). Do It Your Wat: How Understanding Your Personality Will Make You a Better Counselor. Retrieved Dec. 30, 2016, from http://www.acacamps.org/resource-library/camping-magazine/do-it-your-way-how-understanding-your-personality-will-make-you-better-counselor.

Excellerate Performance, Learn About Personality with Free Online Personality Tests. (Apr. 16, 2011). Retrieved Dec. 30, 2016, from https://www.excellerate.co.nz/free-online-personality-tests.html.

K. Appel (Nov. 2, 2013). PSY 150 403 Chapter 12 Slides. Retrieved Dec. 30, 2016, from http://www.slideshare.net/kimappel/psy-150-403-chapter-12-slides.

Non-Final Office Action issued in counterpart U.S. Appl. No. 14/577,866 dated Nov. 15, 2018.

Final Office Action issued in counterpart U.S. Appl. No. 14/577,866 dated May 23, 2019.

* cited by examiner

| | | | | | | | |
|---|---|---|---|---|---|---|---|
| 1. Extraverted, enthusiastic | Disagree strongly ○ | Disagree moderately ○ | Disagree a little ○ | Neither Agree/ disagree ○ | Agree a little ○ | Agree moderately ○ | Agree strongly ○ |
| 2. Critical, quarrelsome | Disagree strongly ○ | Disagree moderately ○ | Disagree a little ○ | Neither Agree/ disagree ○ | Agree a little ○ | Agree moderately ○ | Agree strongly ○ |
| 3. Dependable, Self-disciplined | Disagree strongly ○ | Disagree moderately ○ | Disagree a little ○ | Neither Agree/ disagree ○ | Agree a little ○ | Agree moderately ○ | Agree strongly ○ |
| 4. Anxious, Easily upset | Disagree strongly ○ | Disagree moderately ○ | Disagree a little ○ | Neither Agree/ disagree ○ | Agree a little ○ | Agree moderately ○ | Agree strongly ○ |
| 5. Open to new experiences, complex | Disagree strongly ○ | Disagree moderately ○ | Disagree a little ○ | Neither Agree/ disagree ○ | Agree a little ○ | Agree moderately ○ | Agree strongly ○ |
| 6. Reserved, quiet | Disagree strongly ○ | Disagree moderately ○ | Disagree a little ○ | Neither Agree/ disagree ○ | Agree a little ○ | Agree moderately ○ | Agree strongly ○ |
| 7. Sympathetic, warm | Disagree strongly ○ | Disagree moderately ○ | Disagree a little ○ | Neither Agree/ disagree ○ | Agree a little ○ | Agree moderately ○ | Agree strongly ○ |
| 8. Disorganized, careless | Disagree strongly ○ | Disagree moderately ○ | Disagree a little ○ | Neither Agree/ disagree ○ | Agree a little ○ | Agree moderately ○ | Agree strongly ○ |
| 9. Calm, Emotionally stable | Disagree strongly ○ | Disagree moderately ○ | Disagree a little ○ | Neither Agree/ disagree ○ | Agree a little ○ | Agree moderately ○ | Agree strongly ○ |
| 10. Conventional, uncreative | Disagree strongly ○ | Disagree moderately ○ | Disagree a little ○ | Neither Agree/ disagree ○ | Agree a little ○ | Agree moderately ○ | Agree strongly ○ |

FIG. 5

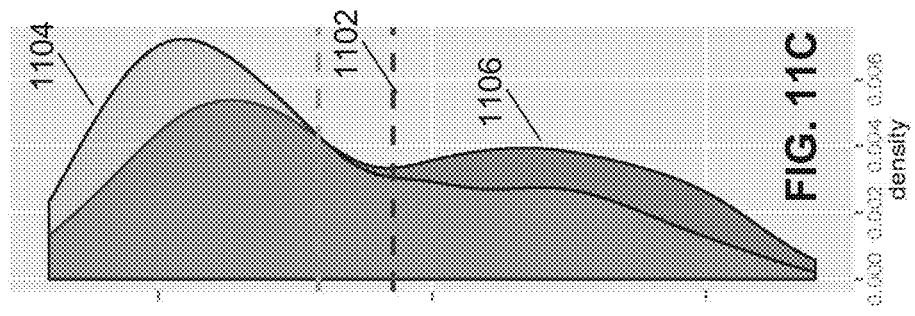
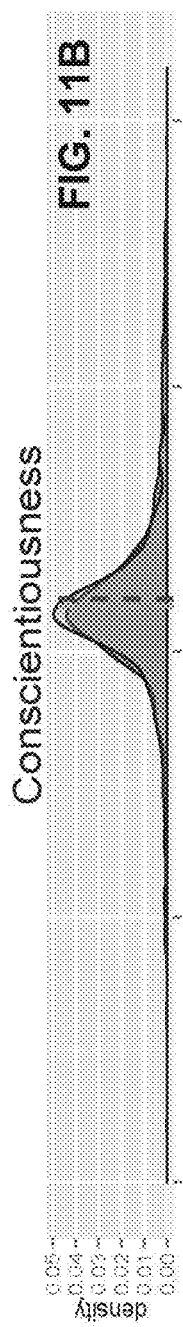
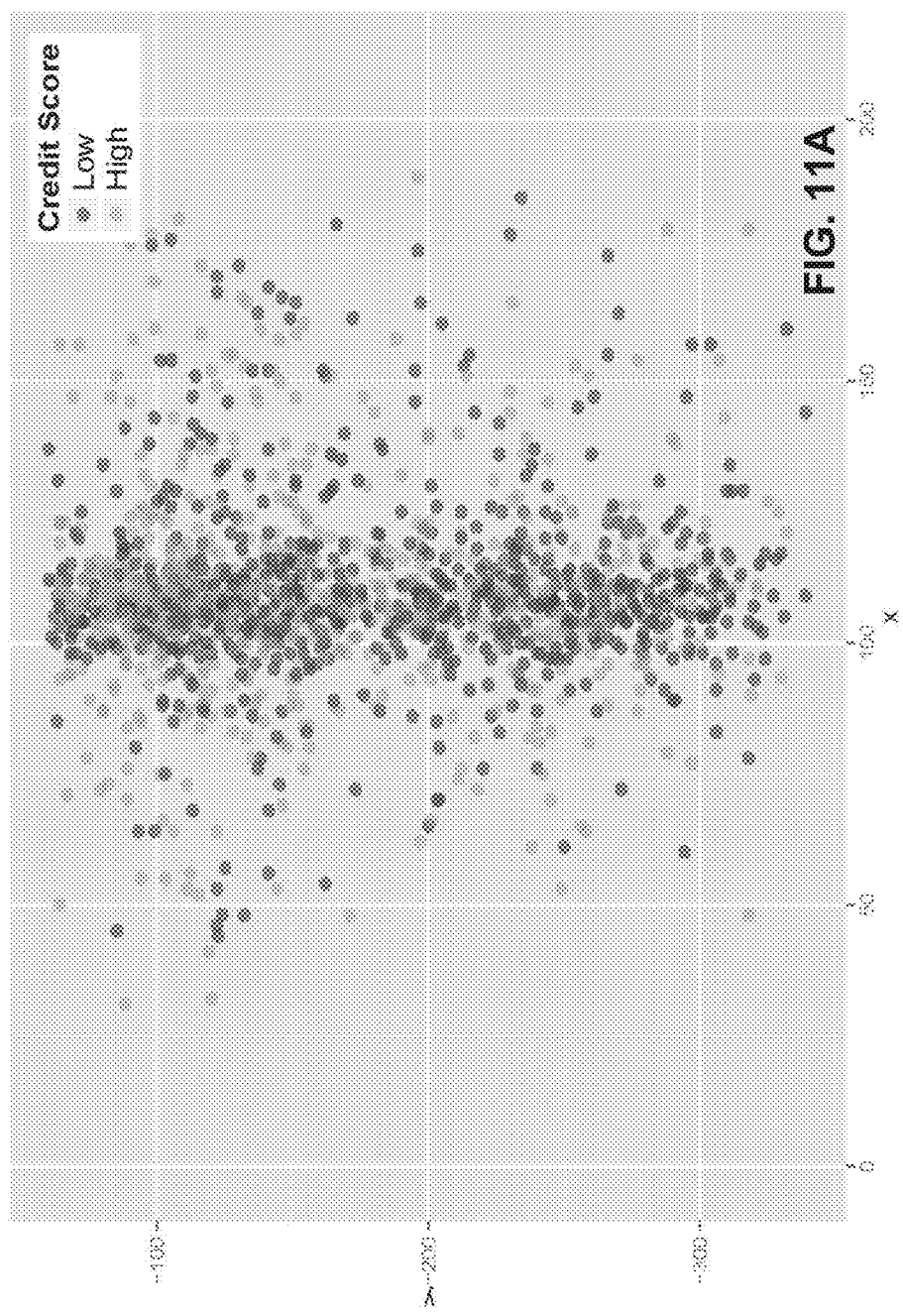
FIG. 11A
FIG. 11B
FIG. 11C

USING PSYCHOMETRIC ANALYSIS FOR DETERMINING CREDIT RISK

RELATED APPLICATIONS

This application claims the benefit of U.S. Utility application Ser. No. 14/577,866, filed on Dec. 19, 2014, entitled "Using Psychometric Analysis for Determining Credit Risk". The entire contents of which is incorporated herein by reference.

BACKGROUND OF THE INVENTION

Credit scores are widely used by lenders because they are inexpensive and largely accepted by consumers and lenders. However, they do have a number of drawbacks. For example, studies have shown that the FICO (Fair Isaac Corporation) score is not always a good predictor of credit risk. Studies have also shown that the accuracy of FICO in predicting delinquency has diminished in recent years. In addition, there are ways for a consumer to game the FICO system. Therefore, improved techniques for predicting credit risk of an individual would be desirable.

BRIEF DESCRIPTION OF THE DRAWINGS

Various embodiments of the invention are disclosed in the following detailed description and the accompanying drawings.

FIG. 5 illustrates a questionnaire that is based upon the Ten-Item Personality Inventory (TIPI).

FIG. 11A illustrates the distribution of the click points on hourglass object 602 for different users who have reported themselves as having a low credit score or a high credit score.

FIG. 11B illustrates the probability distribution (i.e., normalized histogram) of the results shown in FIG. 11A along the x-axis.

FIG. 11C illustrates the probability distribution of the results shown in FIG. 11A along the y-axis.

DETAILED DESCRIPTION

Figure 1:
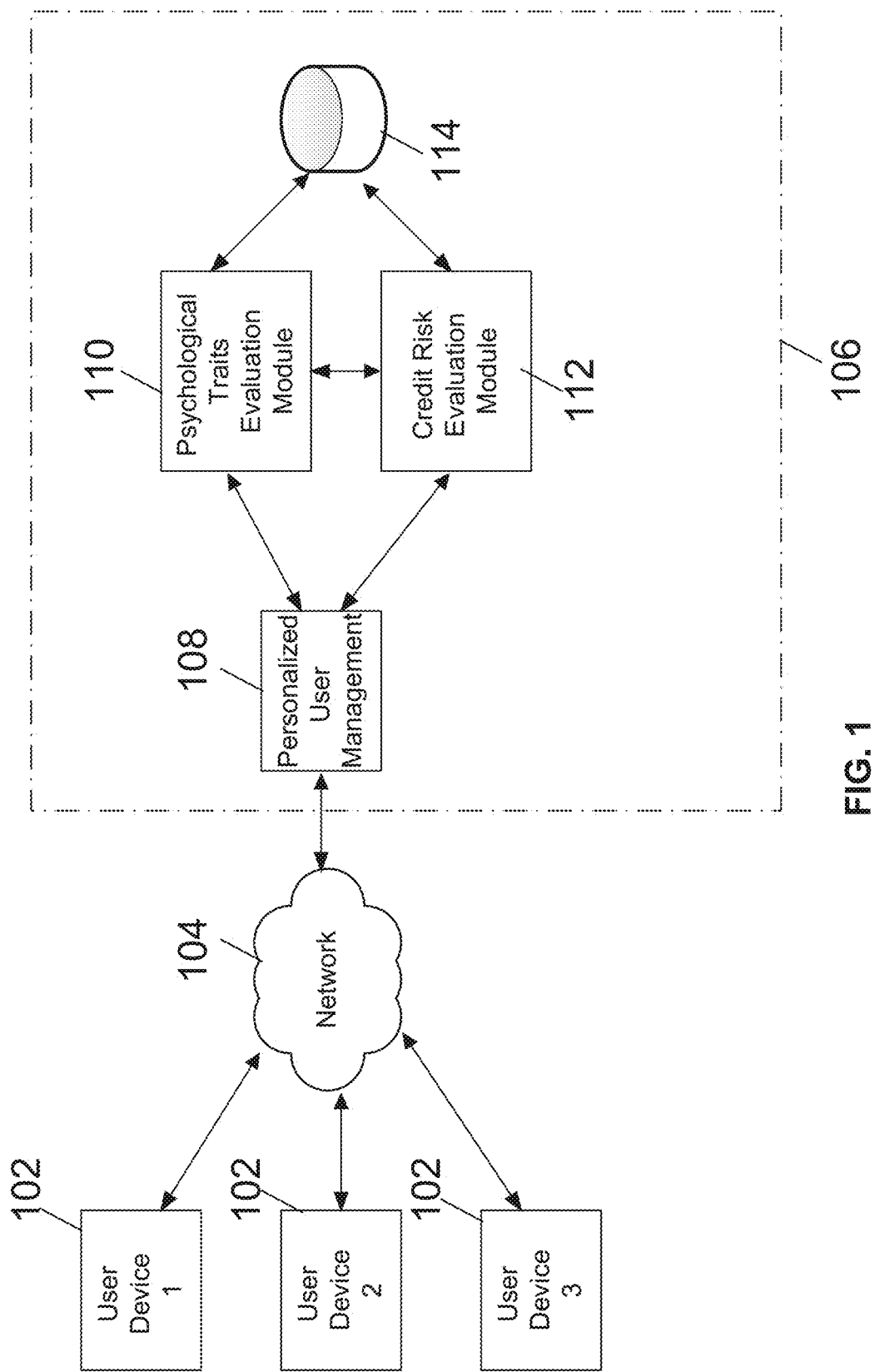
FIG. 1 is a block diagram illustrating an embodiment of a personalized user interaction system 106 for personalizing the interactions with a borrower or potential borrower.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditionally, consumers who want to obtain a mortgage, consolidate loans or credit card debt, or borrow for home improvement or a wedding, would visit a local bank for a personal loan. But increasingly, consumers are finding alternatives to traditional banking from online lenders or online marketplaces.

Traditional banks, credit card companies, and online lenders use an underwriting process to assess the eligibility of a customer to receive its products, including mortgages or credit. For example, these lenders use credit scores to evaluate the potential risk posed by lending money to different consumers. A credit score is a number representing the creditworthiness of a person, i.e., the likelihood that person will pay his or her debts. Credit scores include the FICO (Fair Isaac Corporation) score, Vantage Score, CE Score, and the like.

The FICO model is used by the vast majority of banks and credit grantors, and is based on consumer credit files of the three national credit bureaus: Experian, Equifax, and TransUnion. The FICO score is designed to measure the risk of default by taking into account various factors in a person's financial history, including payment history, debt burden, length of credit history, types of credit used, and any recent searches for credit. There are several types of FICO credit score: classic or generic, bankcard, personal finance, mortgage, installment loan, auto loan, and NextGen score. The generic or classic FICO score is between 300 and 850. Higher scores indicate lower credit risk.

Credit scores are widely used by lenders because they are inexpensive and largely accepted by consumers and lenders. However, they do have a number of drawbacks. For example, studies have shown that FICO is not always a good predictor of credit risk. Studies have also shown that the accuracy of FICO in predicting delinquency has diminished in recent years. In addition, there are ways for a consumer to game the FICO system.

As will be described in greater detail below, psychometrics may be used to enhance the underwriting process for loans and credit. Psychological traits evaluation may be used to enhance the prediction of credit risk of a particular borrower. For example, using machine learning processes or logistic regression, psychological traits evaluation may be used to classify potential borrowers into different categories, from the lowest predicted credit risk to the highest predicted credit risk. The psychological traits evaluation may be used at different stages of the underwriting process. For example, the psychological traits evaluation may be used during an initial screening process or customer identification process, in which only potential borrowers having a predicted credit risk below a certain threshold are considered further in the underwriting process. The psychological traits evaluation may also be used after a loan has been underwritten. For example, the psychological traits evaluation may be used to continuously guide a borrower, determine how to interact with, provide feedback to, and manage the borrower in a variety of settings, e.g., customer service, training, user engagement, and marketing, in a personalized manner, thereby helping the borrower to alter his/her changeable behaviors to further reduce his/her credit risk. In some embodiments, an iconographic psychometric evaluation may be used to provide a psychological traits evaluation for a potential borrower or borrower rapidly, efficiently, and accurately. In contrast to the questionnaire type of psychometric evaluations, which are tedious, lengthy, and boring, the iconographic psychometric evaluation can be quickly performed and is highly engaging, thereby capturing the borrower's attention.

FIG. 1 is a block diagram illustrating an embodiment of a personalized user interaction system 106 for personalizing the interactions with a borrower or potential borrower. Personalized user interaction system 106 includes a personalized user management module 108, a psychological traits evaluation module 110, a credit risk evaluation module 112, and one or more databases for storing psychological traits evaluation and credit risk evaluation data collected by psychological traits evaluation module 110 and credit risk evaluation module, respectively. A plurality of user devices 102 may connect to personalized user interaction system 106 via a network 104. Network 104 may be any combination of public or private networks, including intranets, local-area networks (LANs), wide-area networks (WANs), and the Internet. User devices 102 may include desktop computers, laptops, tablets, smartphones or other computing devices used by potential borrowers or borrowers communicating with personalized user interaction system 106. When a user device 102 is connected to personalized user interaction system 106, a graphical interface may be provided by the system such that the user may browse through different pages, log into an account, or interact with the system in different ways.

Figure 2:
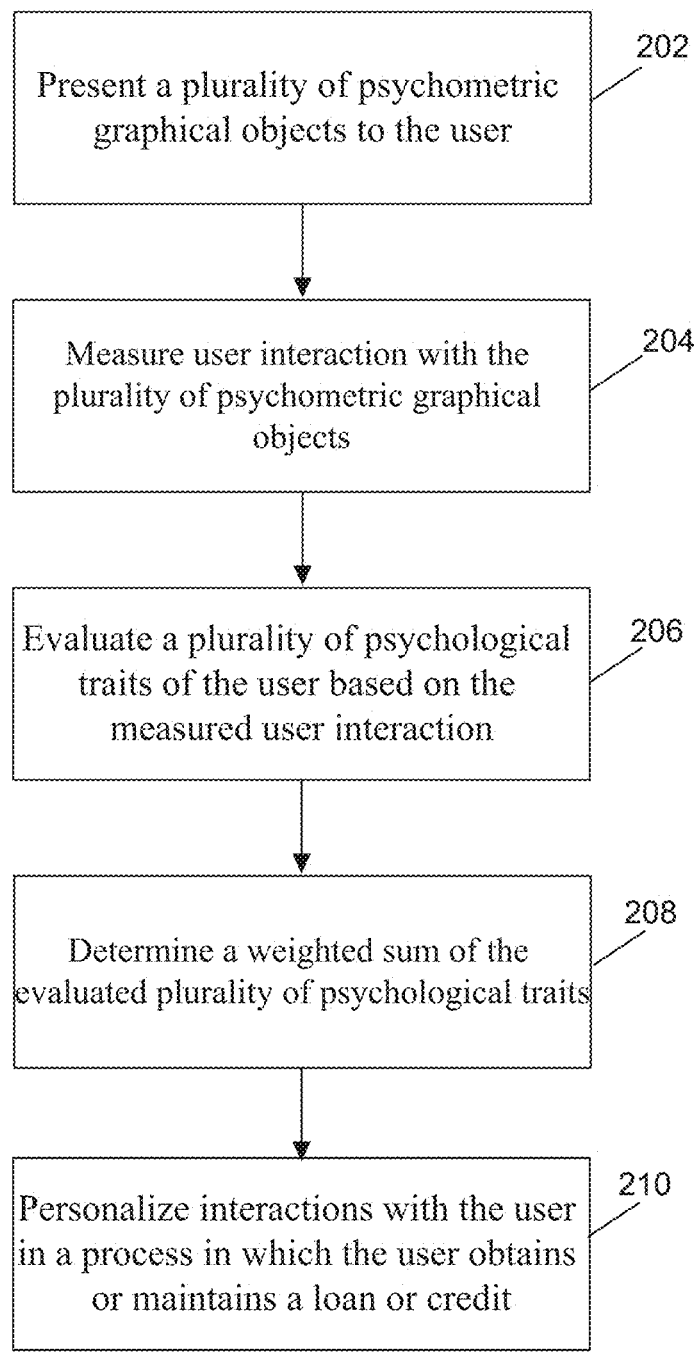
FIG. 2 is a flowchart illustrating an embodiment of a process 200 for personalizing the interactions with a user who is seeking to obtain a loan or credit or who currently has a loan or credit which is managed or monitored by the system.

FIG. 2 is a flowchart illustrating an embodiment of a process 200 for personalizing the interactions with a user who is seeking to obtain a loan or credit or who currently has a loan or credit that is managed or monitored by the system. In some embodiments, process 200 is performed by the various modules of personalized user interaction system 106 as shown in FIG. 1.

With continued reference to FIG. 1 and FIG. 2, at 202, personalized user management module 108 presents a plurality of psychometric graphical objects to a user that is using a user device 102 to connect to personalized user interaction system 106. The psychometric graphical objects may include icons, images, graphs, plots, pie-charts, lines, and the like.

At 204, in response to the plurality of psychometric graphical objects that are presented to the user, the user may interact with the plurality of psychometric graphical objects. For example, the user may click on a portion of a psychometric graphical object, drag on a portion of a psychometric graphical object, select one of many presented psychometric graphical objects, or hover the mouse or other pointing device over a certain area of a psychometric graphical object. Psychological traits evaluation module 110 may measure the user's interaction with the plurality of psychometric graphical objects. Psychological traits evaluation module 110 may measure different types of user interaction information, including the location (e.g., the (x, y) coordinates) of the portion of the psychometric graphical object that the user clicks on, how long the user's mouse hovers over the psychometric graphical object, how long the user takes to select a particular psychometric graphical object, and the like. The measured user's interaction may be optionally stored in database 114.

At 206, psychological traits evaluation module 110 may evaluate a plurality of psychological traits of the user based on the measured user interaction with the plurality of psychometric graphical objects. Different types of psychological traits may be evaluated based on the measured user interaction with different types of psychometric graphical objects. One type of psychological traits includes the Big Five personality traits, which are characteristics related to the five core dimensions of personality, including openness, conscientiousness, extraversion, agreeableness, and neuroticism. Another type of psychological traits includes characteristics related to a user's risk-reward tolerance. Another type of psychological traits includes characteristics related to a user's spending behaviors.

At 208, credit risk evaluation module 112 receives the evaluated plurality of psychological traits of the user either directly from psychological evaluation module 110 or from database 114, and determines a weighted sum of the evaluated plurality of psychological traits of the user. The weighted sum may be determined by machine learning processes or logistic regression. The weighted sum may be used as a metric for classifying the user into one of many categories, each category having a different level of predicted credit risk. For example, the first category has the lowest predicted credit risk; the second category has a higher predicted credit risk, and so on.

Figure 3:
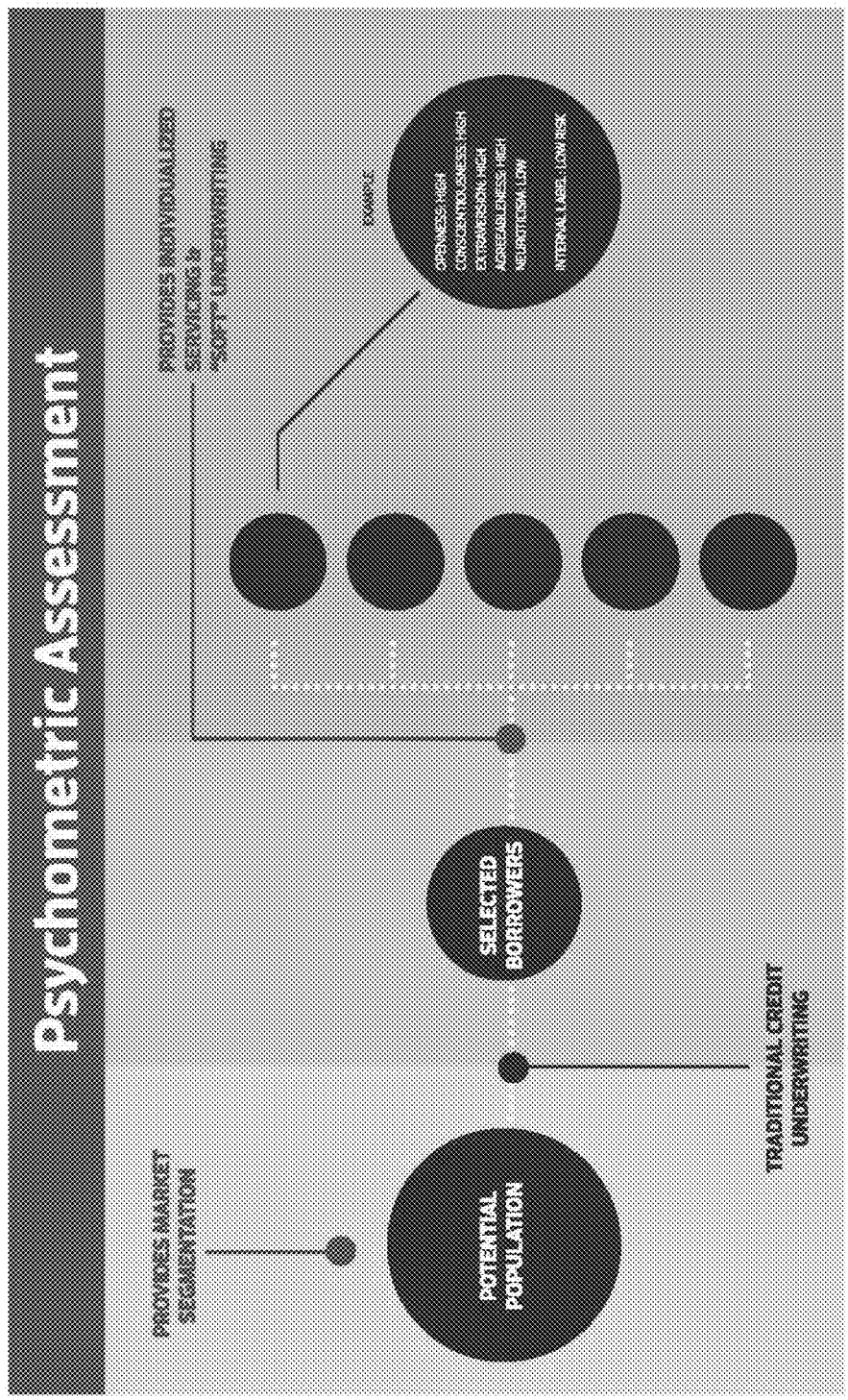
FIG. 3 illustrates one embodiment of an application of psychometric assessments to business flow.

At 210, personalized user management module 108 may personalize any interactions between the system and the user during an underwriting process. The personalization is based on the weighted sum or the predicted credit risk of the user. The underwriting process includes multiple phases. FIG. 3 illustrates one embodiment of an application of psychometric assessments to business flow. Initially, the psychometric assessments may be used for market segmentation. During this phase, the user has not been qualified for a loan or a credit. During this phase, personalized user management module 108 may identify the user as a potential customer based on the user's predicted credit risk. The personalized interactions may include sending the user an invitation to open an initial account with the system, sending the user marketing information about programs that may be suitable to her, and the like. In another phase, the user has already been qualified for a loan or a credit through the system. During this phase, personalized user management module 108 may provide on-going personalized customer support and guidance to the user based on the user's psychometric evaluation and predicted credit risk. The personalized interactions may include sending the user feedbacks about his/her financial actions or decisions, sending alerts to the user regarding payment deadlines, sending financial-related tips and information to the user, and the like. These personalized interactions may help the user to alter his/her changeable behaviors to further reduce his/her credit risk.

Different types of psychometric graphical objects may be used to evaluate different types of psychological traits. In some embodiments, hourglass shaped psychometric graphical objects are used to evaluate different personality traits of the users. In some embodiments, a plurality of psychometric graphical objects representing risk-to-reward ratios is used to evaluate the risk-reward tolerance or investment style of the users. In some embodiments, a plurality of psychometric graphical objects representing the schedule of spending over time is used to evaluate spending style and behaviors of the users.

In some embodiments, psychometric graphical objects are used to evaluate different personality traits of the users. The personality traits may be related to different dimensions of an individual. For example, some dimensions are core traits that remain largely unchanged throughout an individual's life. Some dimensions are based on learning experience, and are more likely to change based on the life experiences and events of the individual. Some personality traits are related to the five core dimensions of personality (also referred to as the Big Five personality traits), including openness, conscientiousness, extraversion, agreeableness, and neuroticism. For example, personality traits related to openness include imagination and insight. Personality traits related to conscientiousness include a high level of thoughtfulness, good impulse control, and goal-directed behavior. Personality traits related to extraversion include excitability, sociability, talkativeness, assertiveness, and a high degree of emotional expressiveness. Personality traits related to agreeableness include trust, altruism, kindness, affection, and other prosocial behaviors. Personality traits related to neuroticism include emotional instability, anxiety, moodiness, irritability, and sadness. Note that the various personality traits described above are provided for illustration purposes only; accordingly, the present application is not limited to the above described personality traits only.

Figure 4:
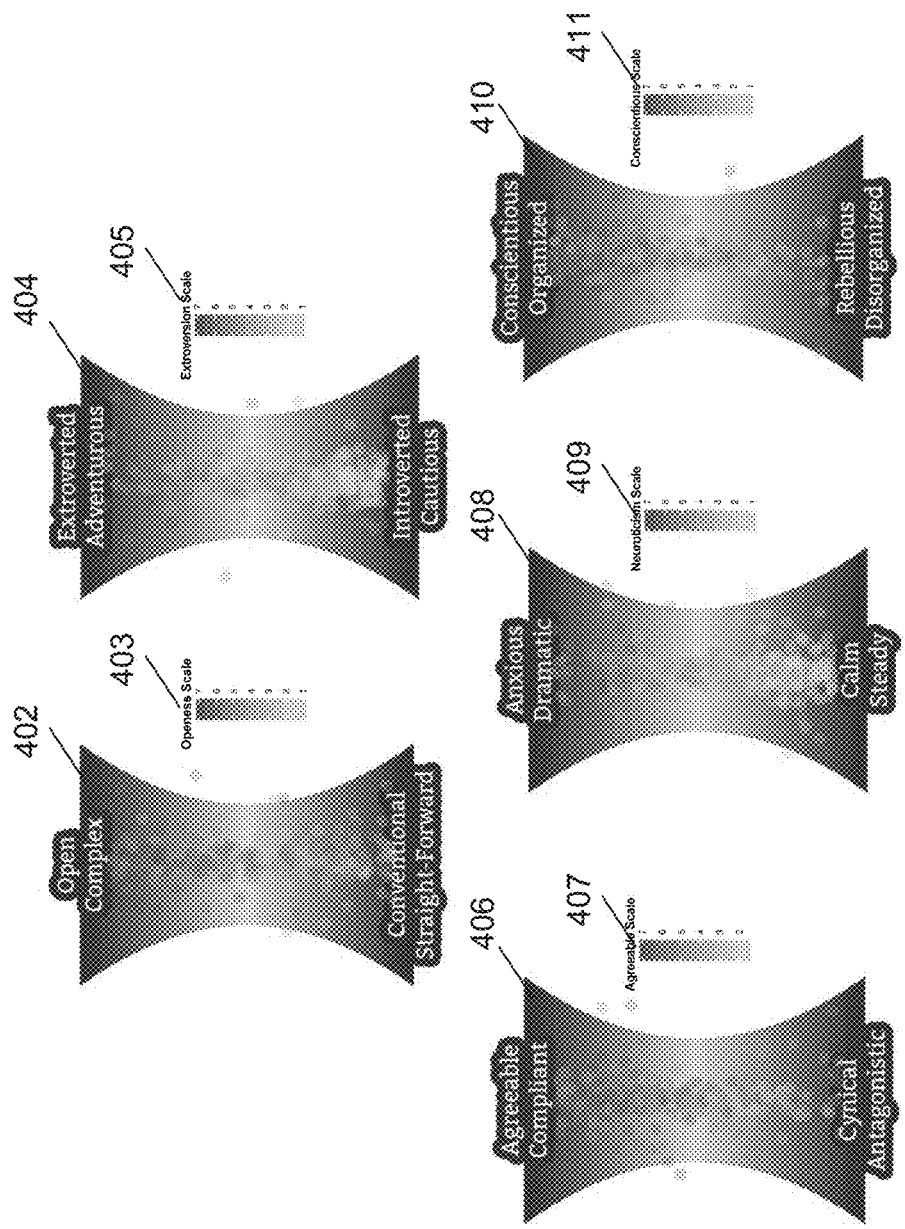
FIG. 4 illustrates an embodiment of a plurality of hourglass shaped psychometric graphical objects that can be used to evaluate different personality traits of the users.

FIG. 4 illustrates an embodiment of a plurality of hourglass shaped psychometric graphical objects that can be used to evaluate different personality traits of the users. FIG. 5 illustrates a questionnaire that is based upon the Ten-Item Personality Inventory (TIPI). The TIPI was designed to assess the traits defined by the Big Five personality traits—openness, conscientiousness, extraversion, agreeableness, and neuroticism. As will be described in greater detail below, the evaluation results derived from users interacting with the hourglass shaped psychometric graphical objects as shown in FIG. 4 correlate well with the evaluation results derived from users answering the TIPI ten-item questionnaire as shown in FIG. 5. However, one of the advantages of using the psychometric graphical objects as shown in FIG. 4 is that it can evaluate the psychological traits of a potential borrower or borrower rapidly, efficiently, and accurately. In addition, the experience provided to the user is highly visual, engaging, and intuitive, thereby capturing the user's attention. In contrast, the TIPI ten-item questionnaire as shown in FIG. 5 requires the user to read a larger amount of text, which is tedious, lengthy, and boring. Furthermore, the choices provided by the TIPI ten-item questionnaire to the users to choose from are discrete with a coarse level of granularity, while the choices provided by the hourglass shaped psychometric graphical objects to the users are continuous with a much finer level of granularity (e.g., pixel level of granularity).

FIG. 4 illustrates five hourglass shaped psychometric graphical objects (402, 404, 406, 408, and 410) for a user to interact with. Object 402 may be used to evaluate the personality trait of openness. Object 404 may be used to evaluate the personality trait of extraversion. Object 406 may be used to evaluate the personality trait of agreeableness. Object 408 may be used to evaluate the personality trait of neuroticism. Object 410 may be used to evaluate the personality trait of conscientiousness.

Each of the hourglass shaped psychometric graphical objects as shown in FIG. 4 correspond to two of the questions in the TIPI ten-item questionnaire as shown in FIG. 5. For example, object 402 corresponds to question 5 and question 10 of the questionnaire. In question 5, the user is asked to rank how strongly disagree or agree that the user views himself/herself as being "open to new experiences" or "complex." In question 7, the user is asked to rank how strongly disagree or agree that the user views himself/herself as being "conventional" or "uncreative". As being "open to new experiences" or "complex" is very dissimilar to or opposite from being "conventional" or "straight-forward," a user who ranks himself highly (i.e., agree strongly) in the former two traits would likely rank himself lower in the latter two traits. Similarly, a user who ranks himself lower in the former two traits would likely rank himself higher in the latter two traits. In each of the questions, the user is asked to rank himself/herself according to seven discrete levels— disagree strong, disagree moderately, disagree a little, neither agree/disagree, agree a little, agree moderately, and agree strongly.

In contrast, each of the hourglass shaped psychometric graphical objects allows a user to click on a continuous scale, thereby providing the user a much finer level of granularity of choices to choose from. For example, object 402 displays the keywords "open" and "complex" at the top and widest part of the hourglass and the keywords "conventional" and "straight-forward" at the bottom and widest part of the hourglass, and the user is allowed to click on any part of hourglass psychometric graphical object 402 such that the x and y coordinates of the click point can be determined and recorded. The hourglass shape is wider at the top base and at the bottom base, but narrower in the middle. It is also symmetric along the x-axis and the y-axis. These characteristics visually invite the user to click along a centered vertical line that divides the hourglass shape equally. One of the advantages of the method is that it encourages more consistent user behavior when the user is interacting with the graphical objects. In some embodiments, the hourglass shape's narrowest part has lighter shading. This characteristic helps a user to visualize the middle of the object, which represents a neutral trait. One of the advantages of the method is that it gives the user a better sense perceptually of how far or how close he is associating himself with a particular trait. In addition, only five mouse clicks (one click on each hourglass object) are required to evaluate the traits defined by the Big Five personality traits—openness, conscientiousness, extraversion, agreeableness, and neuroticism. Therefore, the evaluation for a particular user can be performed in a relatively short period of time.

The evaluation results derived from users interacting with the hourglass shaped psychometric graphical objects as shown in FIG. 4 correlate well with the evaluation results derived from users answering the TIPI ten-item questionnaire as shown in FIG. 5. For example, results in FIG. 4 show that users who score higher in the openness scale 403 based on the TIPI ten-item questionnaire tend to click on the upper portion of the hourglass object 402, the portion that is closer on the y-axis to the words "open" and "complex."

Figure 6A:
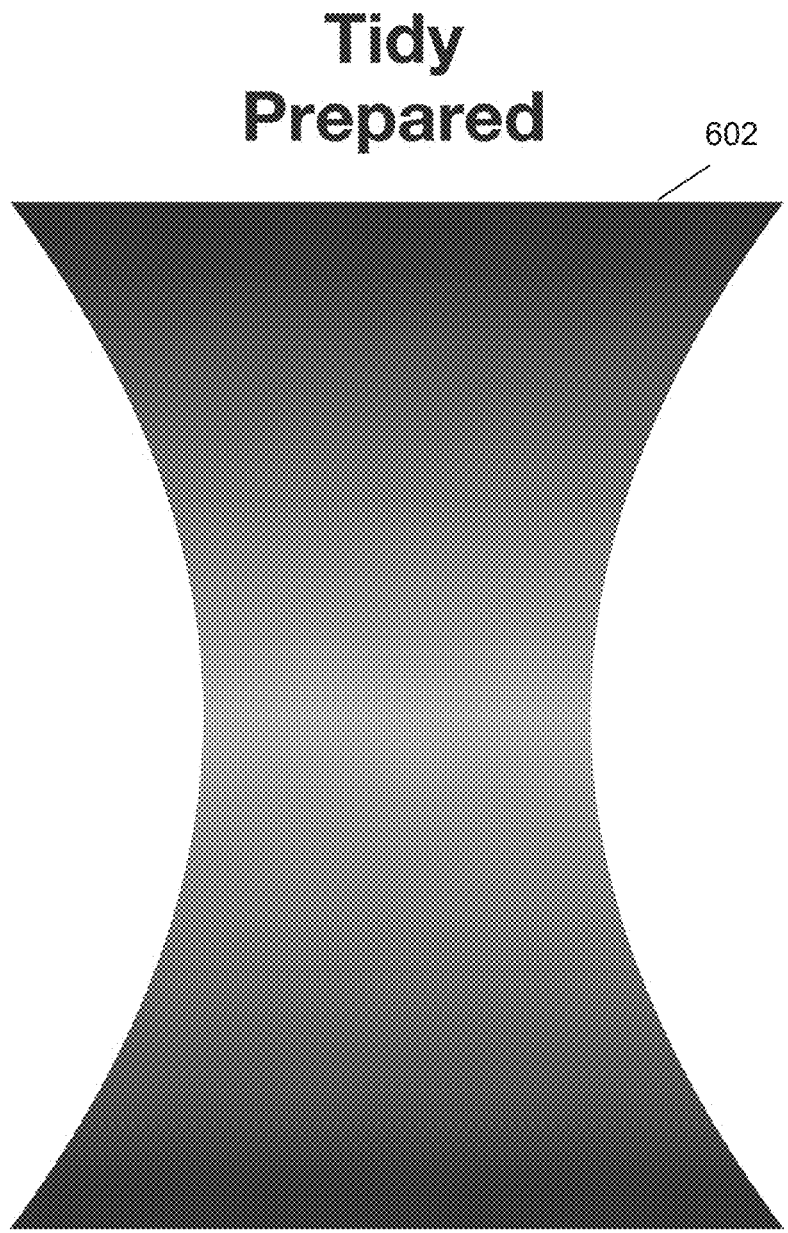
FIG. 6A illustrates an embodiment of an hourglass shaped psychometric graphical object 602 related to conscientiousness.
Figure 6D:
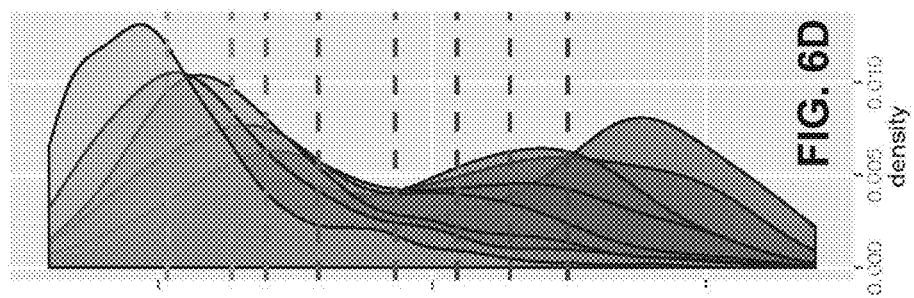
FIG. 6D illustrates the probability distribution of the results shown in FIG. 6B along the y-axis.
Figure 6C:
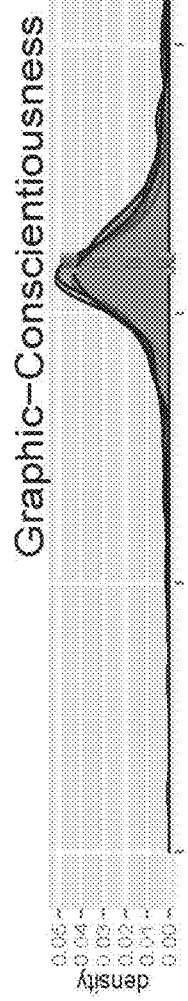
FIG. 6C illustrates the probability distribution (i.e., normalized histogram) of the results shown in FIG. 6B along the x-axis.
Figure 6B:
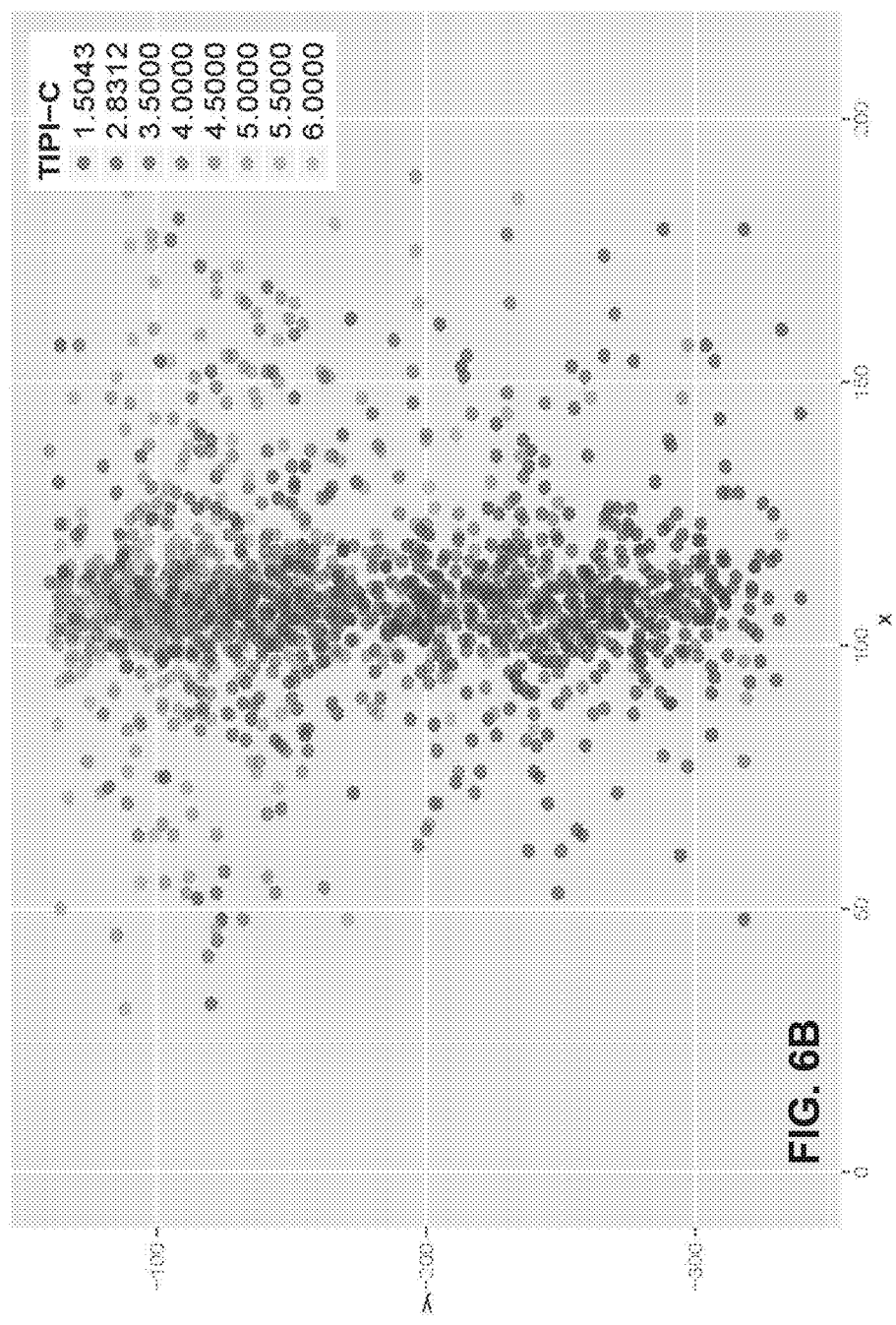
FIG. 6B illustrates the distribution of the click points on the hourglass object for different users having different TIPI-conscientiousness (TIPI-C) scores.

FIGS. 6A-6D show another illustrative example that the results derived from users interacting with a hourglass shaped psychometric graphical object related to conscientiousness correlate well with the evaluation results derived from users answering the TIPI questions that are related to conscientiousness. FIG. 6A illustrates an embodiment of an hourglass shaped psychometric graphical object 602 related to conscientiousness. FIG. 6B illustrates the distribution of the click points on the hourglass object for different users having different TIPI-conscientiousness (TIPI-C) scores. FIG. 6C illustrates the probability distribution (i.e., normalized histogram) of the results shown in FIG. 6B along the x-axis. FIG. 6D illustrates the probability distribution of the results shown in FIG. 6B along the y-axis. Users who score higher in the TIPI-conscientiousness scale (e.g., TIPI-C score=6.0) tend to click on the upper portion of the hourglass object. Therefore, the evaluation of the psychological traits of users based on the hourglass shaped psychometric graphical objects is accurate with finer granularity, in addition to being efficient, highly visual, engaging, and intuitive.

Figure 7:
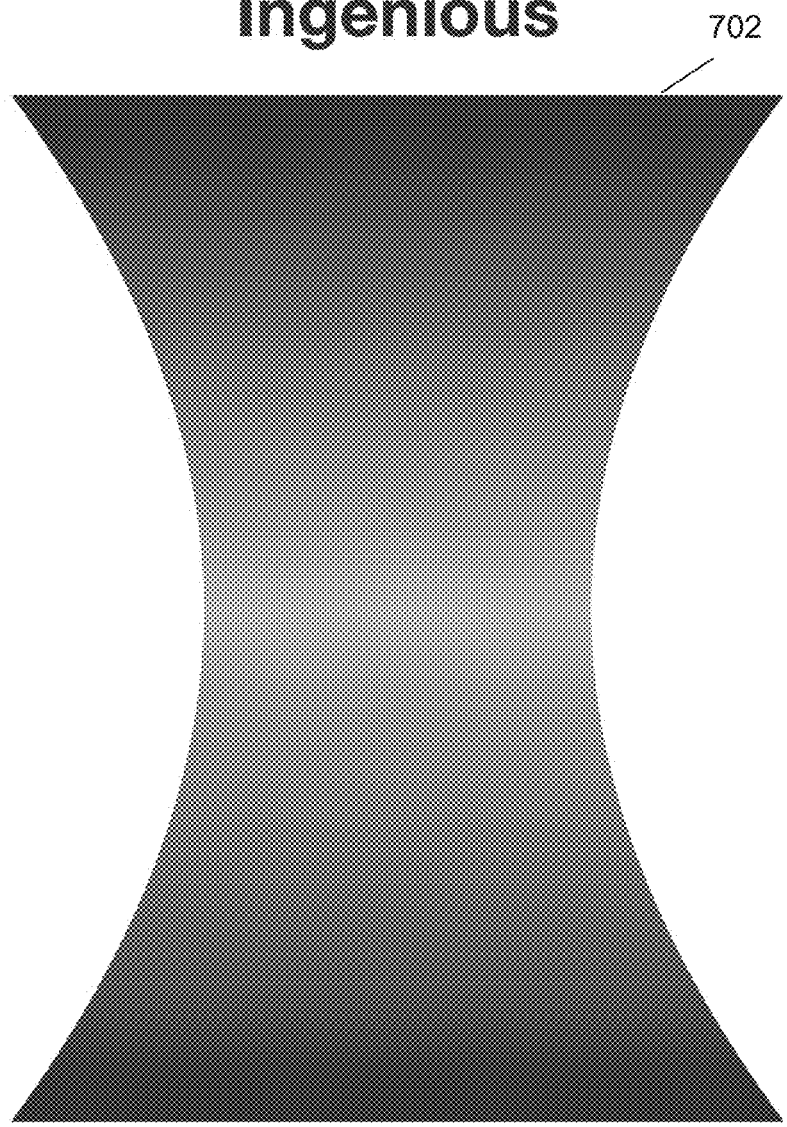
FIG. 7 illustrates an embodiment of an hourglass shaped psychometric graphical object 702 related to openness.
Figure 8:
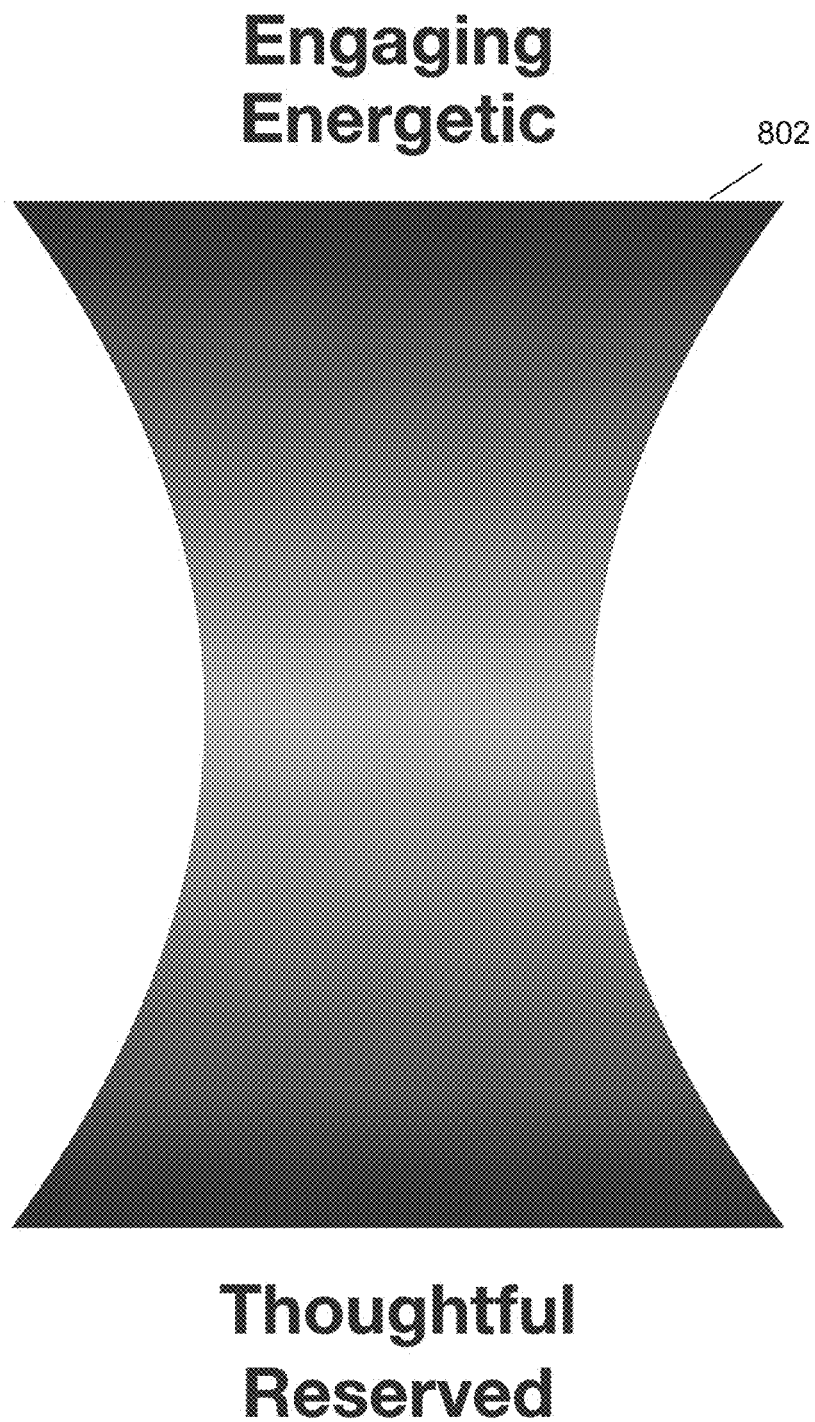
FIG. 8 illustrates an embodiment of an hourglass shaped psychometric graphical object 802 related to extraversion.
Figure 9:
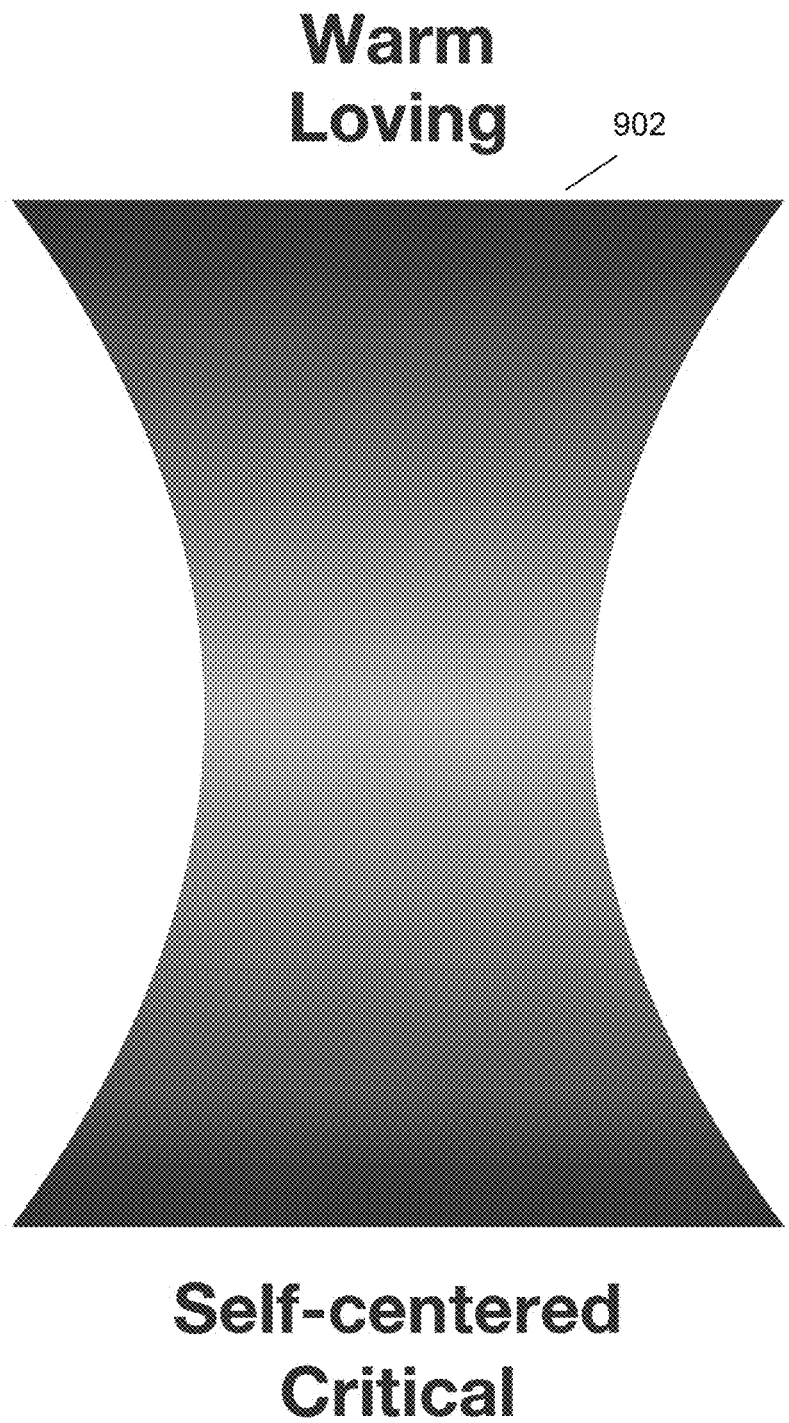
FIG. 9 illustrates an embodiment of an hourglass shaped psychometric graphical object 902 related to agreeableness.
Figure 10:
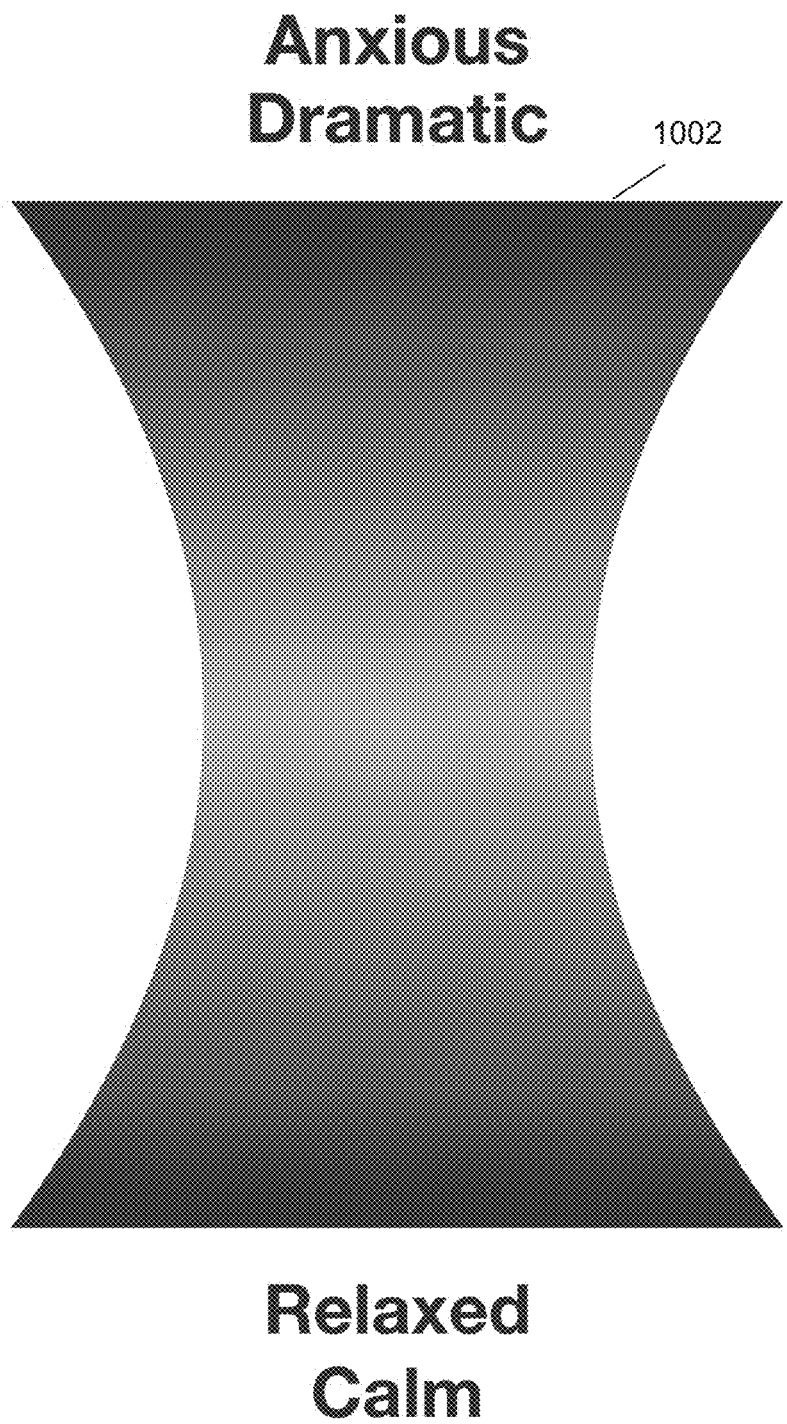
FIG. 10 illustrates an embodiment of an hourglass shaped psychometric graphical object 1002 related to neuroticism.

FIG. 7 illustrates an embodiment of an hourglass shaped psychometric graphical object 702 related to openness. FIG. 8 illustrates an embodiment of an hourglass shaped psychometric graphical object 802 related to extraversion. FIG. 9 illustrates an embodiment of an hourglass shaped psychometric graphical object 902 related to agreeableness. FIG. 10 illustrates an embodiment of an hourglass shaped psychometric graphical object 1002 related to neuroticism.

FIGS. 11A-11C illustrate that the evaluated psychological traits of the users are correlated with the users' credit risk. FIG. 11A illustrates the distribution of the click points on hourglass object 602 for different users who have reported themselves as having low credit scores or high credit scores. FIG. 11B illustrates the probability distribution (i.e., normalized histogram) of the results shown in FIG. 11A along the x-axis. FIG. 11C illustrates the probability distribution of the results shown in FIG. 11A along the y-axis. In particular, curve 1104 is the probability distribution of users with high credit scores along the y-axis. Curve 1106 is the probability distribution of users with low credit scores along the y-axis. As shown in curve 1104 of FIG. 11C, users who report higher credit scores tend to click on the upper portion of the hourglass object, i.e., they tend to have higher scores of conscientiousness. As shown in FIG. 11C, there is a significant difference in the area under curves 1104 and 1106 when y is below a threshold 1102. Therefore, if the users who have a conscientiousness score below threshold 1102 are eliminated, a larger portion of the users with low credit scores are eliminated as compared to those with high credit scores. This shows that the evaluated psychological traits of the users may be used to predict the users' credit risk.

Figure 12A:
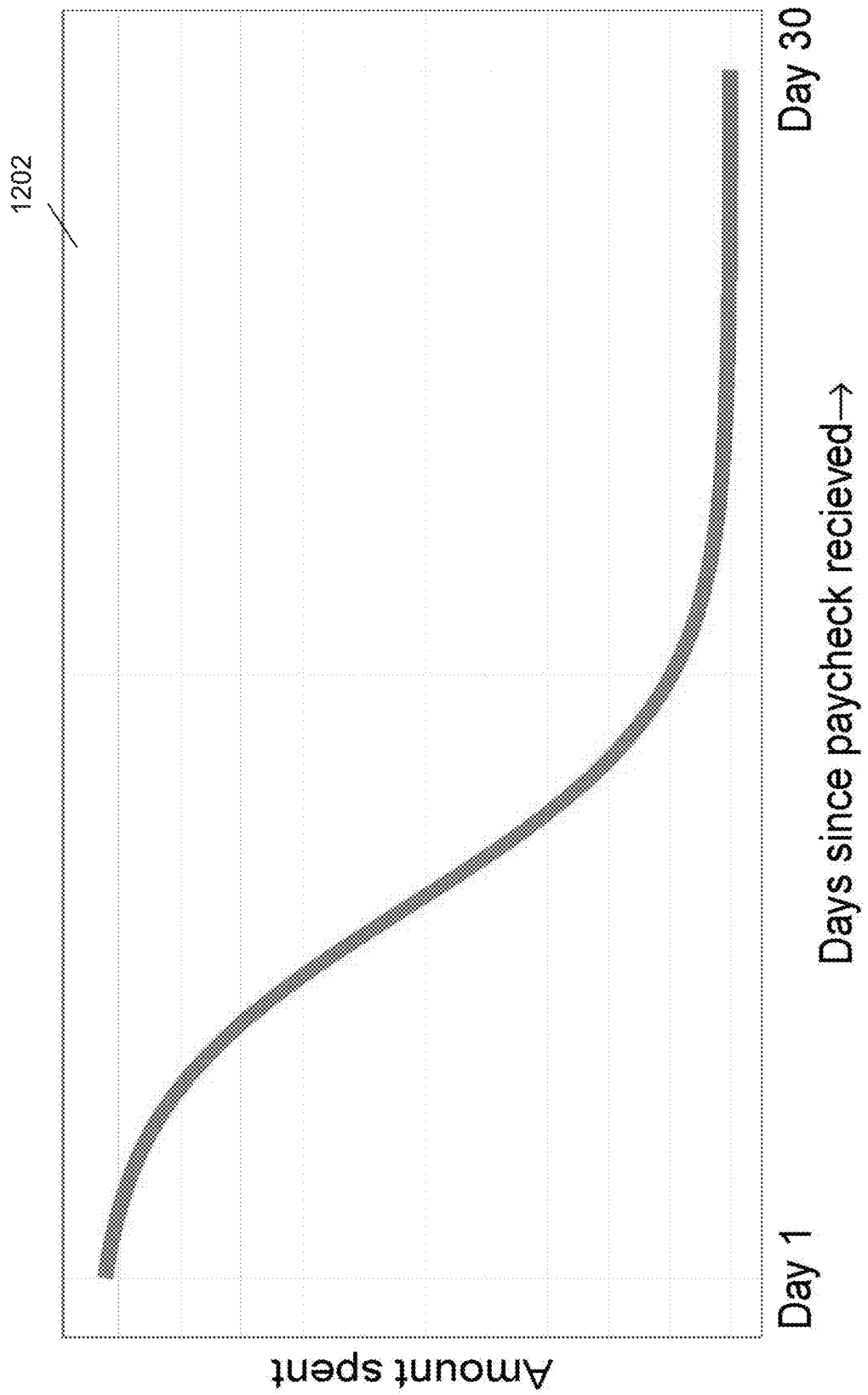
FIGS. 12A-12E illustrate an embodiment of a set of five psychometric graphical objects (1202, 1204, 1206, 1208, and 1210) that can be used to evaluate spending patterns of the users.
Figure 12B:
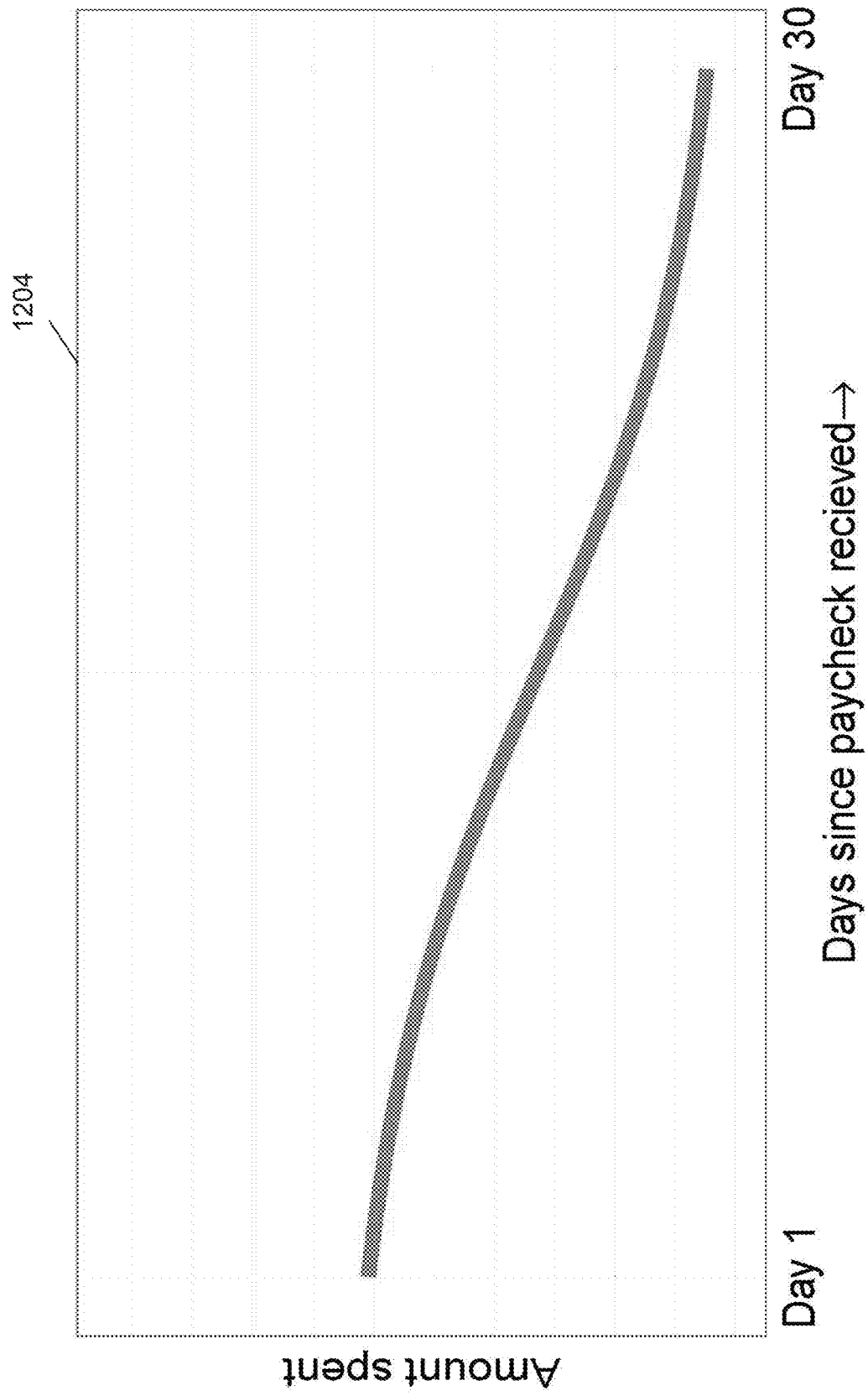
Figure 12C:
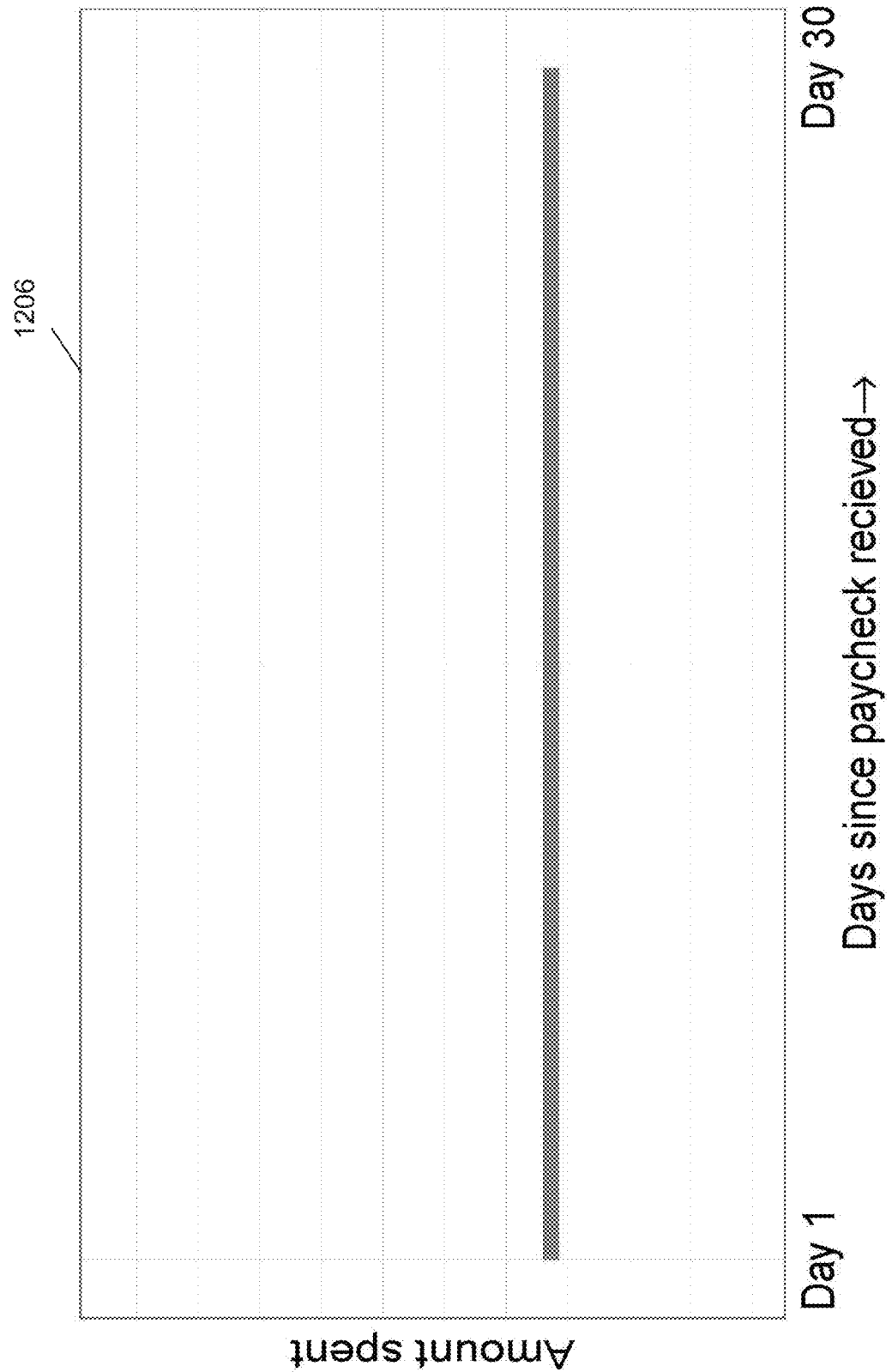
Figure 12D:
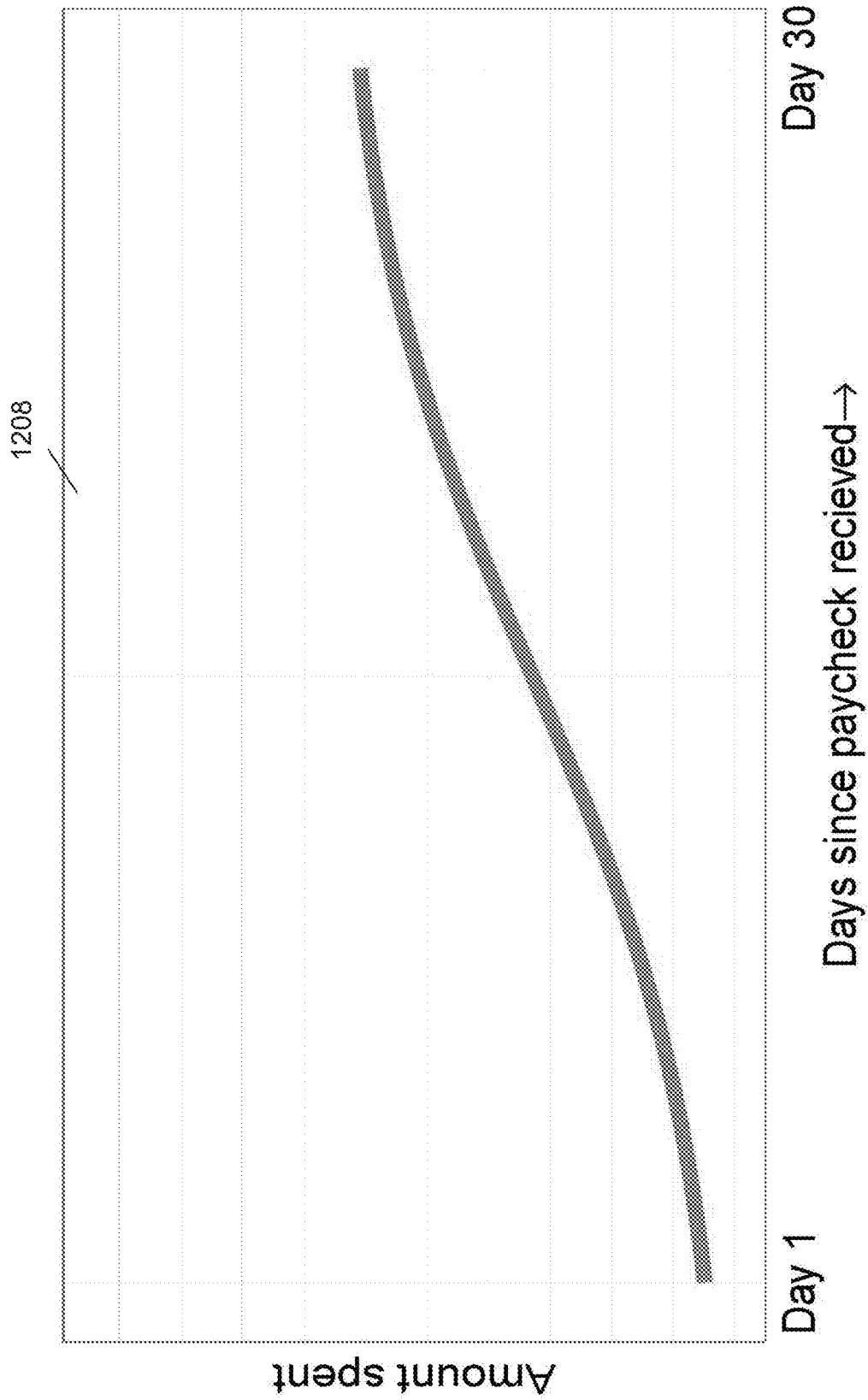
Figure 12E:
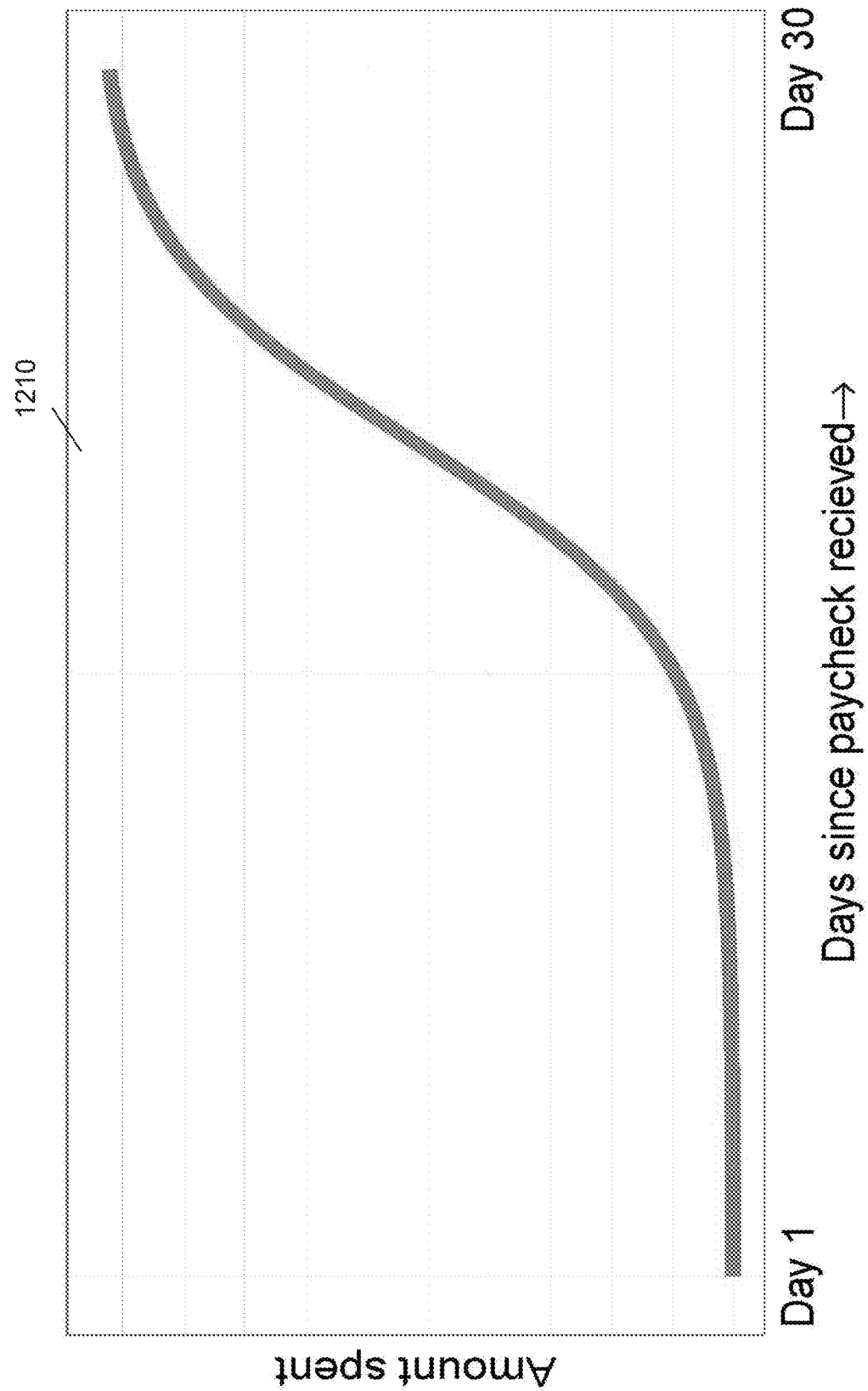

In some embodiments, psychometric graphical objects are used to evaluate the spending style and behavior of the users. FIGS. 12A-12E illustrate an embodiment of a set of five psychometric graphical objects (1202, 1204, 1206, 1208, and 1210) that can be used to evaluate the spending patterns of the users. Each of the graphical objects includes a spending curve. In particular, in each of the graphical objects, the amount spent is plotted along the y-axis and the number of days since the user's paycheck is received is plotted along the x-axis. In FIG. 12A, spending curve 1202 shows that the user spends the most at the beginning of the 30-day cycle, then spends less and less until the middle of the cycle, and then his spending remains at a very low level until the end of the 30-day cycle. In FIG. 12B, spending curve 1204 shows that the user spends the most at the beginning of the 30-day cycle, then spends less and less until the end of the 30-day cycle. In FIG. 12C, spending curve 1206 shows that the user spends a constant amount throughout the 30-day cycle. In FIG. 12D, spending curve 1208 shows that the user spends the least at the beginning of the 30-day cycle, then spends more and more until the end of the 30-day cycle. In FIG. 12E, spending curve 1210 shows that the user spends the least at the beginning of the 30-day cycle, and then his spending remains at a very low level until the middle of the cycle, and then his spending increases rapidly until the end of the 30-day cycle.

Figure 13:
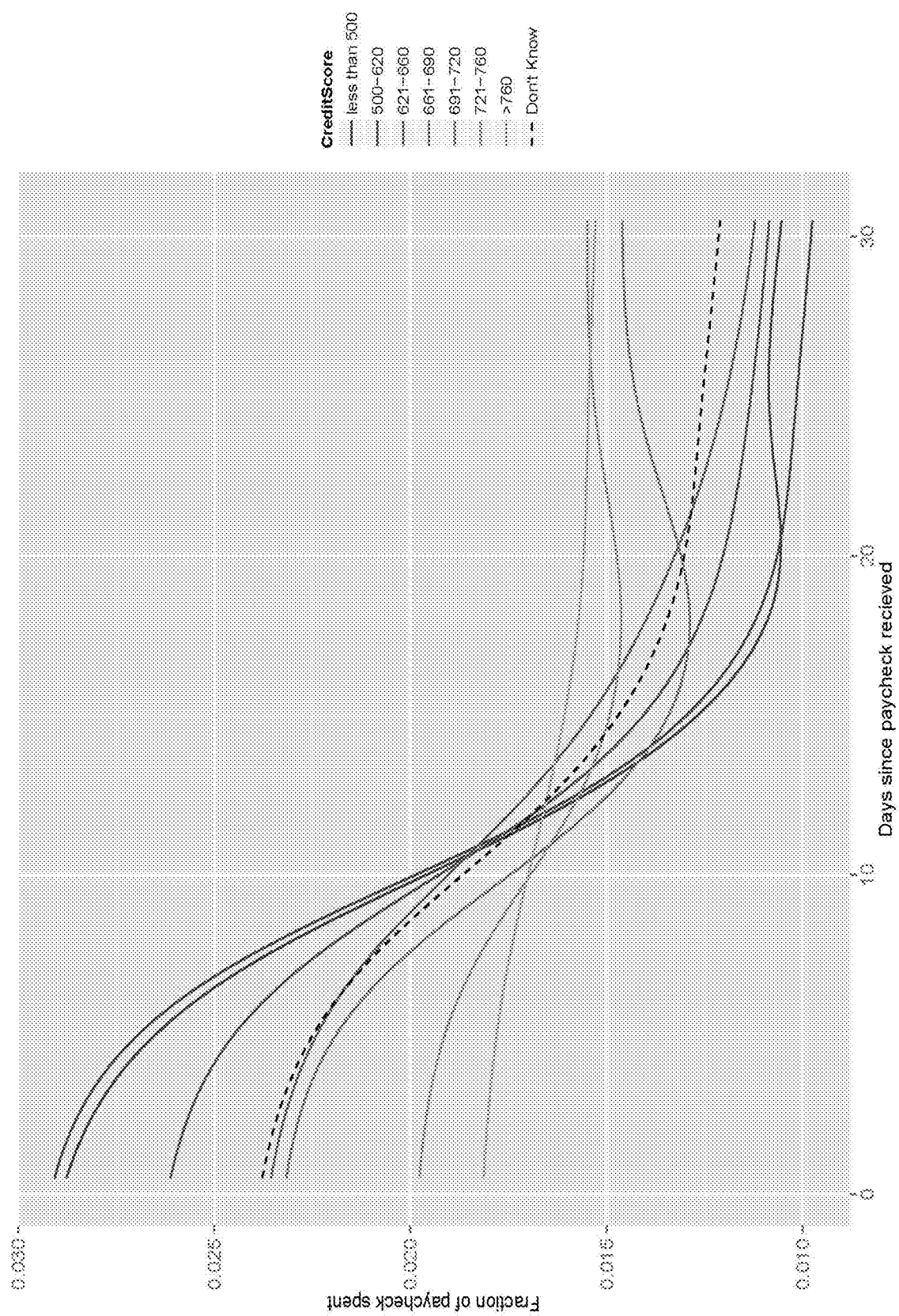
FIG. 13 shows that users who have low credit scores (e.g., with credit scores lower than 500) on average have a spending pattern that is closest to spending curve 1202.

Users are presented the above-mentioned five spending curves and then they are asked to select by clicking the spending curve that best represents how they spend their monthly paycheck after their bills are paid. Each of the spending curves are assigned a score, e.g., from one to five. FIG. 13 illustrates that the spending curve that the user picks is correlated with the user's credit risk. For example, FIG. 13 shows that users who have low credit scores (e.g., with credit scores lower than 500) on average have a spending pattern that is closest to spending curve 1202. In other words, the users who have low credit scores on average spend the most at the beginning of the 30-day cycle, then spend less and less until the middle of the cycle, and then spending remains at a very low level until the end of the 30-day cycle. FIG. 13 also shows that users who have high credit scores (e.g., with credit scores higher than 700) on average have a spending pattern that is closest to spending curve 1206. These users on average spend a constant amount throughout the 30-day cycle. This shows that the evaluated spending style and behaviors of the users may be used to predict the users' credit risks.

Figure 14A:
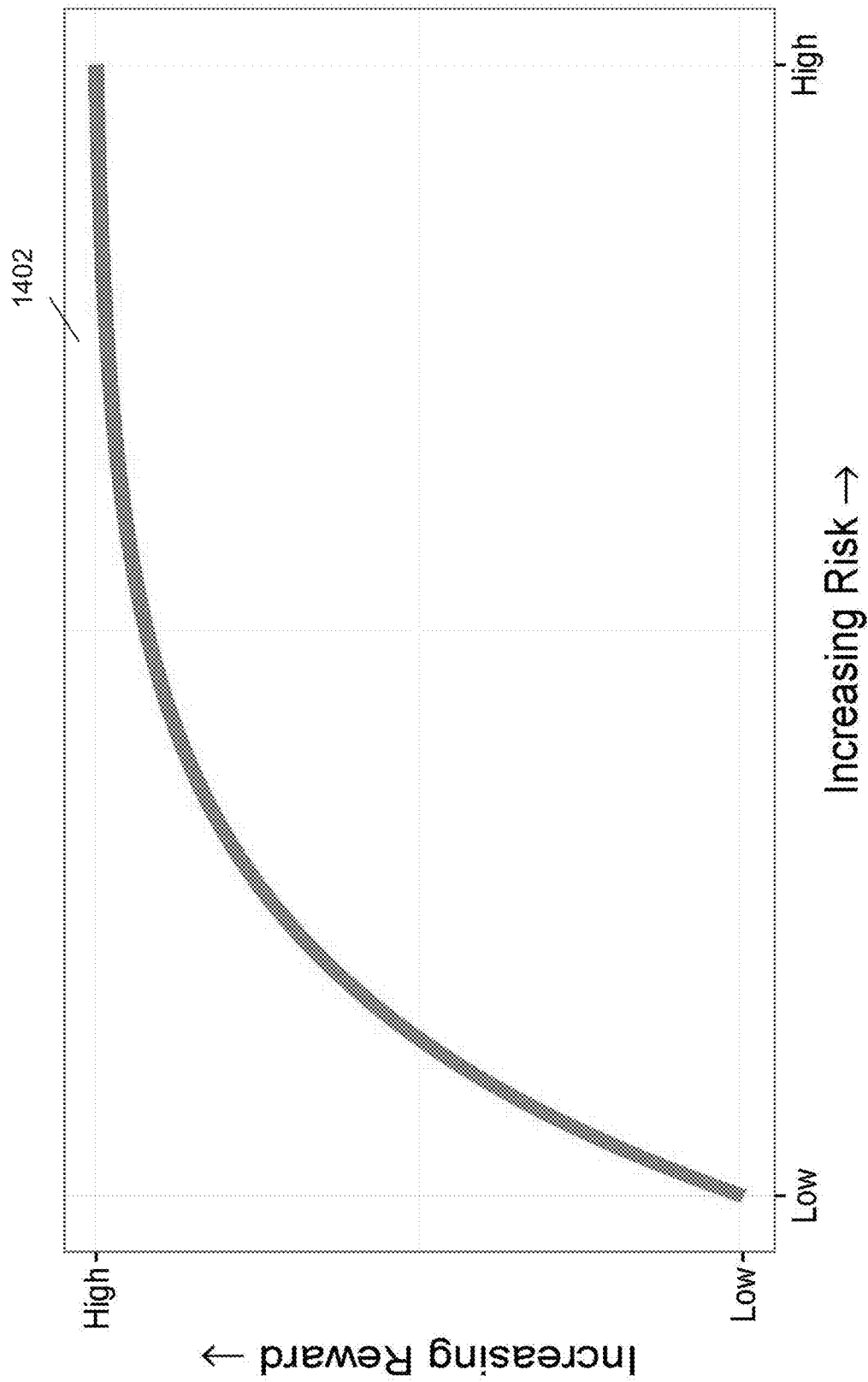
FIG. 14A illustrates a risk-reward curve 1402 that is a logarithmic curve.
Figure 14B:
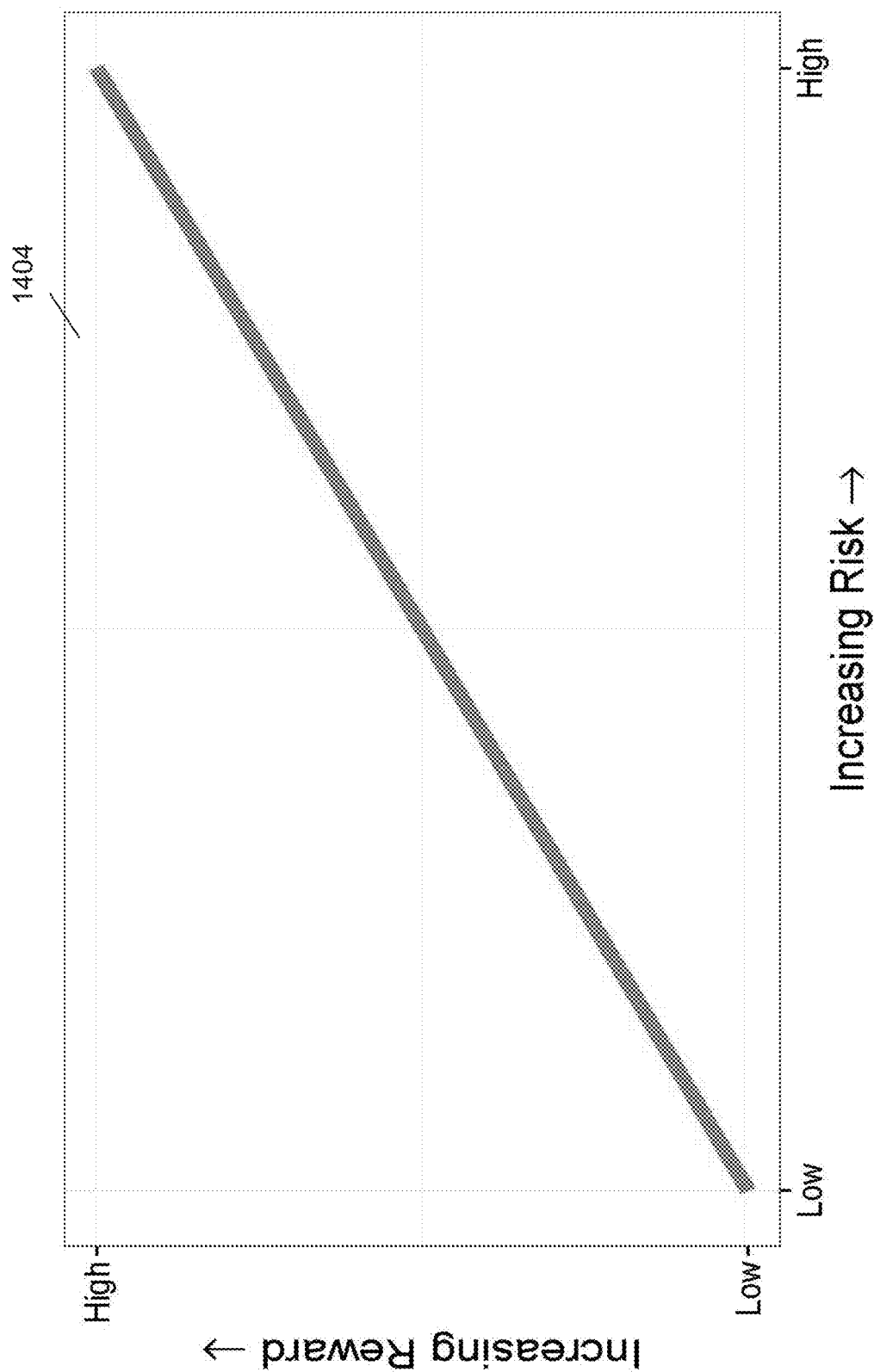
FIG. 14B illustrates a risk-reward curve 1404 that is a linear curve.
Figure 14C:
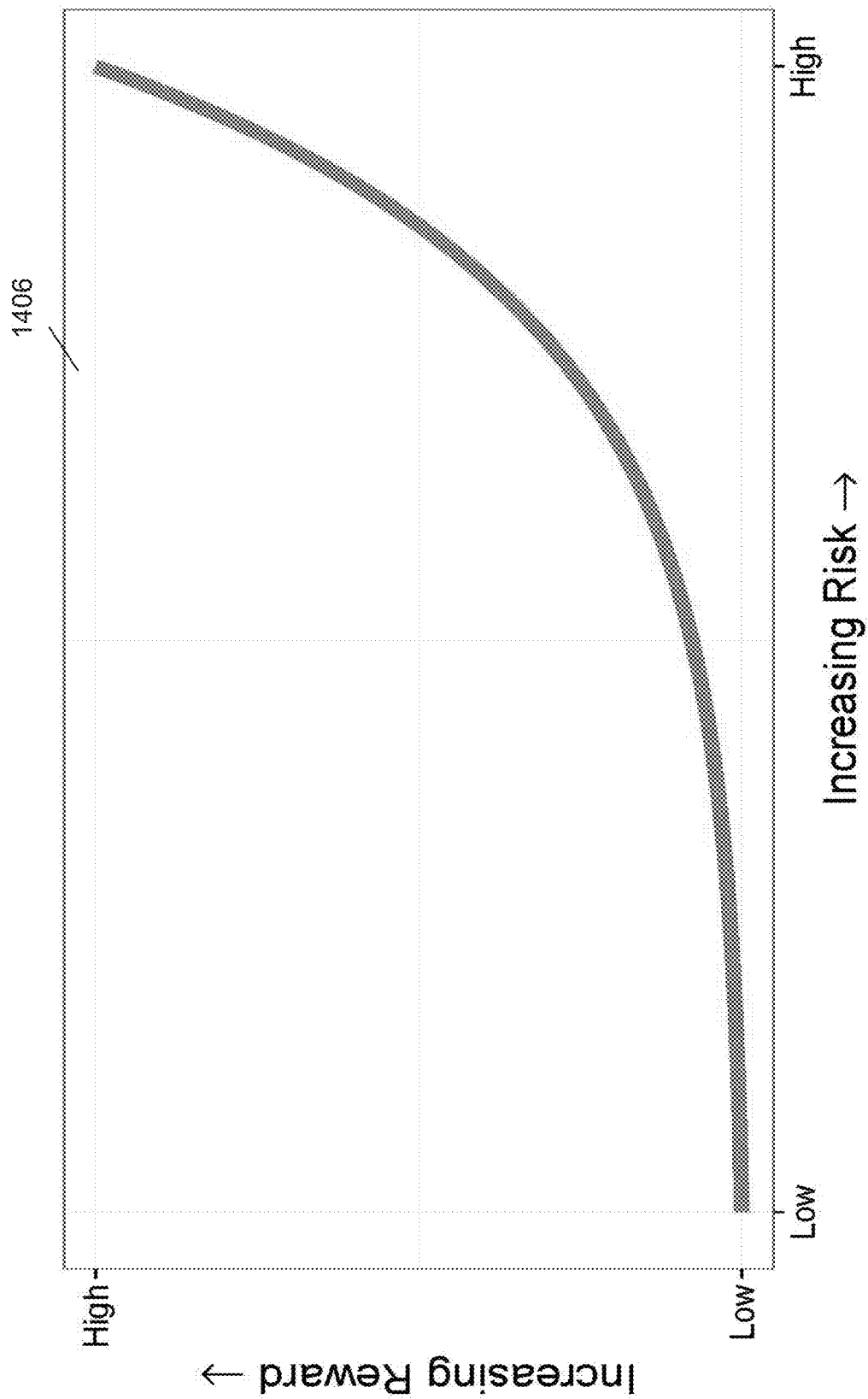
FIG. 14C illustrates a risk-reward curve 1406 that is an exponential curve.

In some embodiments, psychometric graphical objects are used to evaluate risk-reward tolerance or the investment style of the users. FIGS. 14A-14C illustrate an embodiment of a set of three psychometric graphical objects (1402, 1404, and 1406) that can be used to evaluate risk-reward tolerance of the users. Each of the graphical objects includes a risk-reward curve. In particular, in each of the graphical objects, the amount of reward is plotted along the y-axis and the amount of risk involved is plotted along the x-axis. In FIG. 14A, risk-reward curve 1402 is a logarithmic curve. With a logarithmic risk-reward relationship, moderate early risk is required in order to obtain increasing reward. In FIG. 14B, risk-reward curve 1404 is a linear curve. With a linear risk-reward relationship, a constant increase of risk is required in order to obtain constant increase of reward. In FIG. 14C, risk-reward curve 1406 is an exponential curve. With an exponential risk-reward relationship, a large amount of early risk is required in order to obtain increasing reward.

Figure 15A:
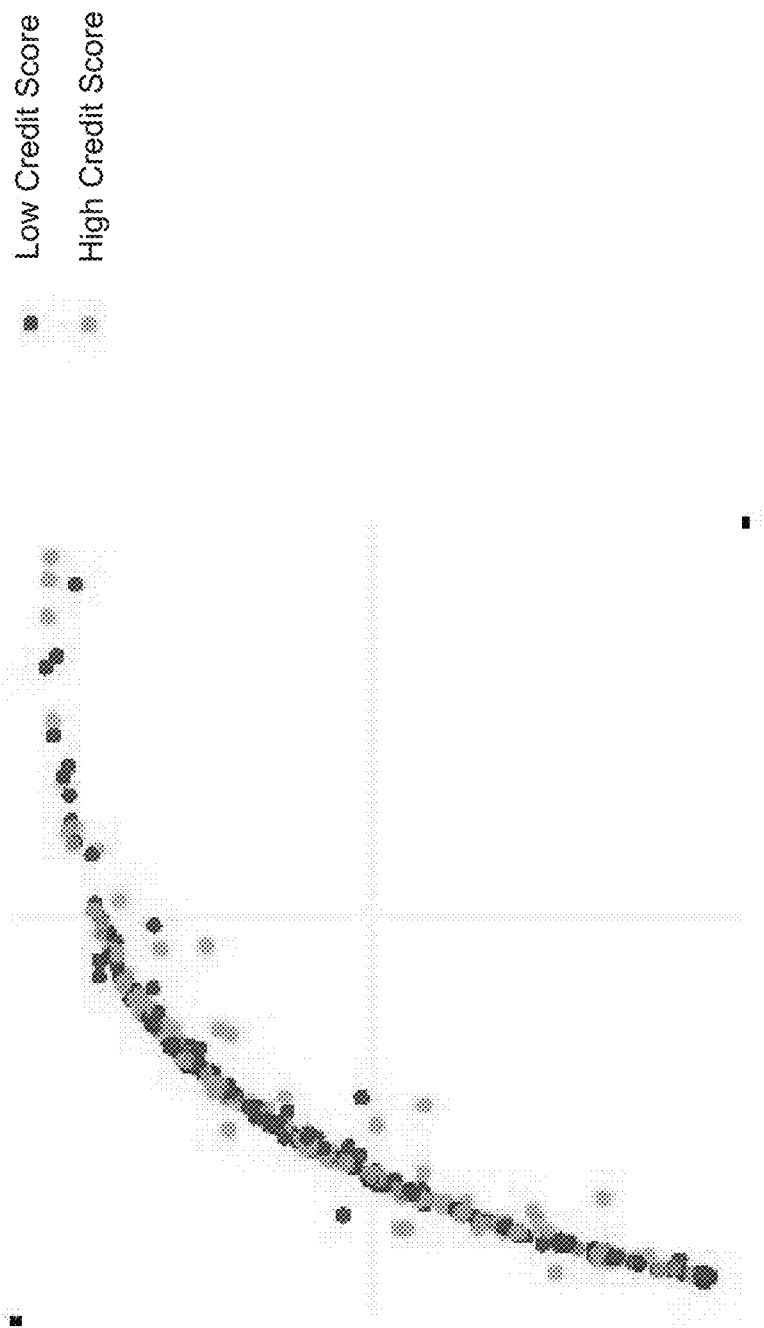
FIG. 15A illustrates the distribution of the click points on risk-reward curve 1402 for users who have reported themselves as having low credit scores or high credit scores.
Figure 15B:
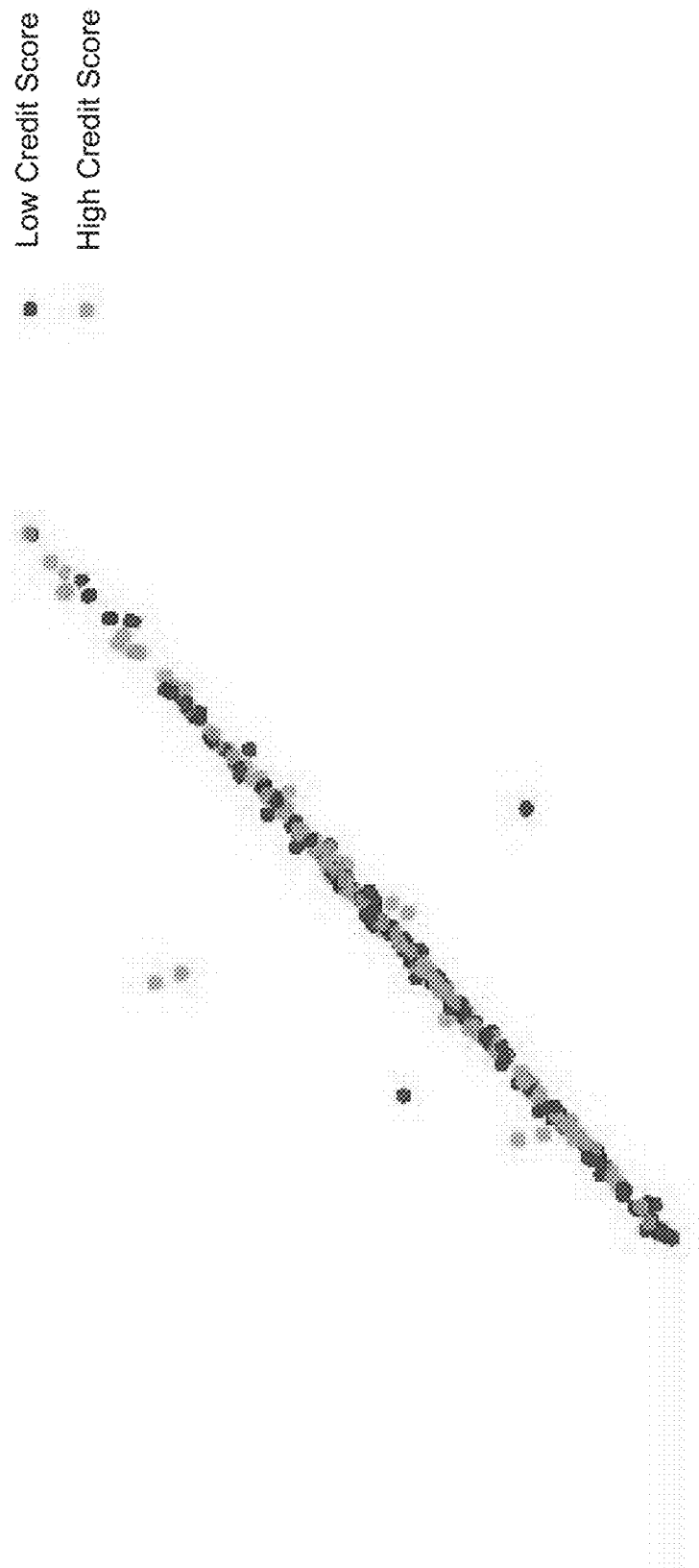
FIG. 15B illustrates the distribution of the click points on risk-reward curve 1404 for users who have reported themselves as having low credit scores or high credit scores.
Figure 15C:
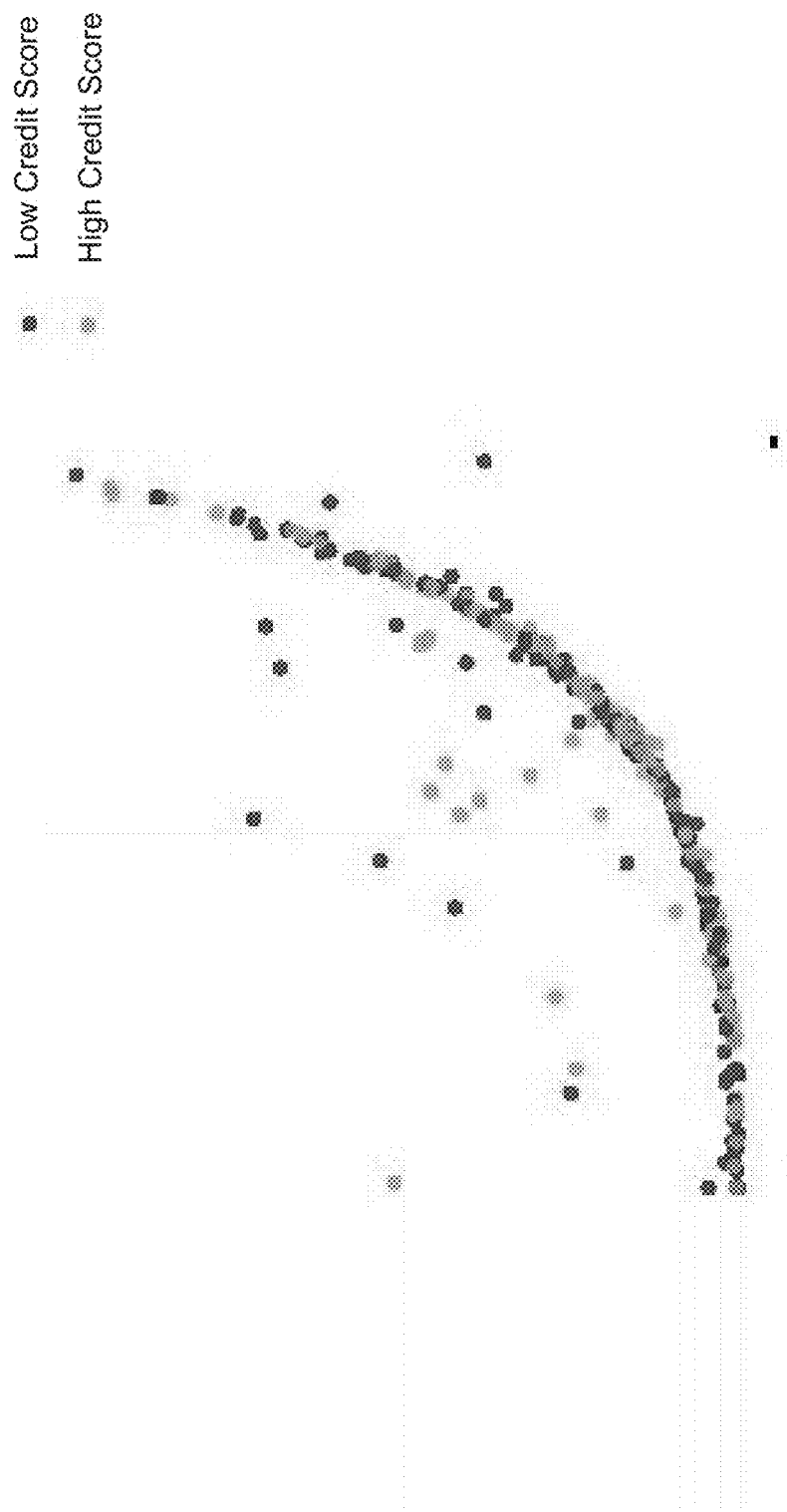
FIG. 15C illustrates the distribution of the click points on risk-reward curve 1406 for users who have reported themselves as having low credit scores or high credit scores.

Users are presented the above-mentioned three risk-reward curves and they are asked to click on one point on each of the risk-reward curves that best represents their preferred risk-reward combination given the particular risk-reward relationship. FIG. 15A illustrates the distribution of the click points on risk-reward curve 1402 for users who have reported themselves as having low credit scores or high credit scores. FIG. 15B illustrates the distribution of the click points on risk-reward curve 1404 for users who have reported themselves as having low credit scores or high credit scores. FIG. 15C illustrates the distribution of the click points on risk-reward curve 1406 for users who have reported themselves as having low credit scores or high credit scores. A score may be assigned to the user based on how the user clicks on each of the risk-reward curves.

Figure 16:
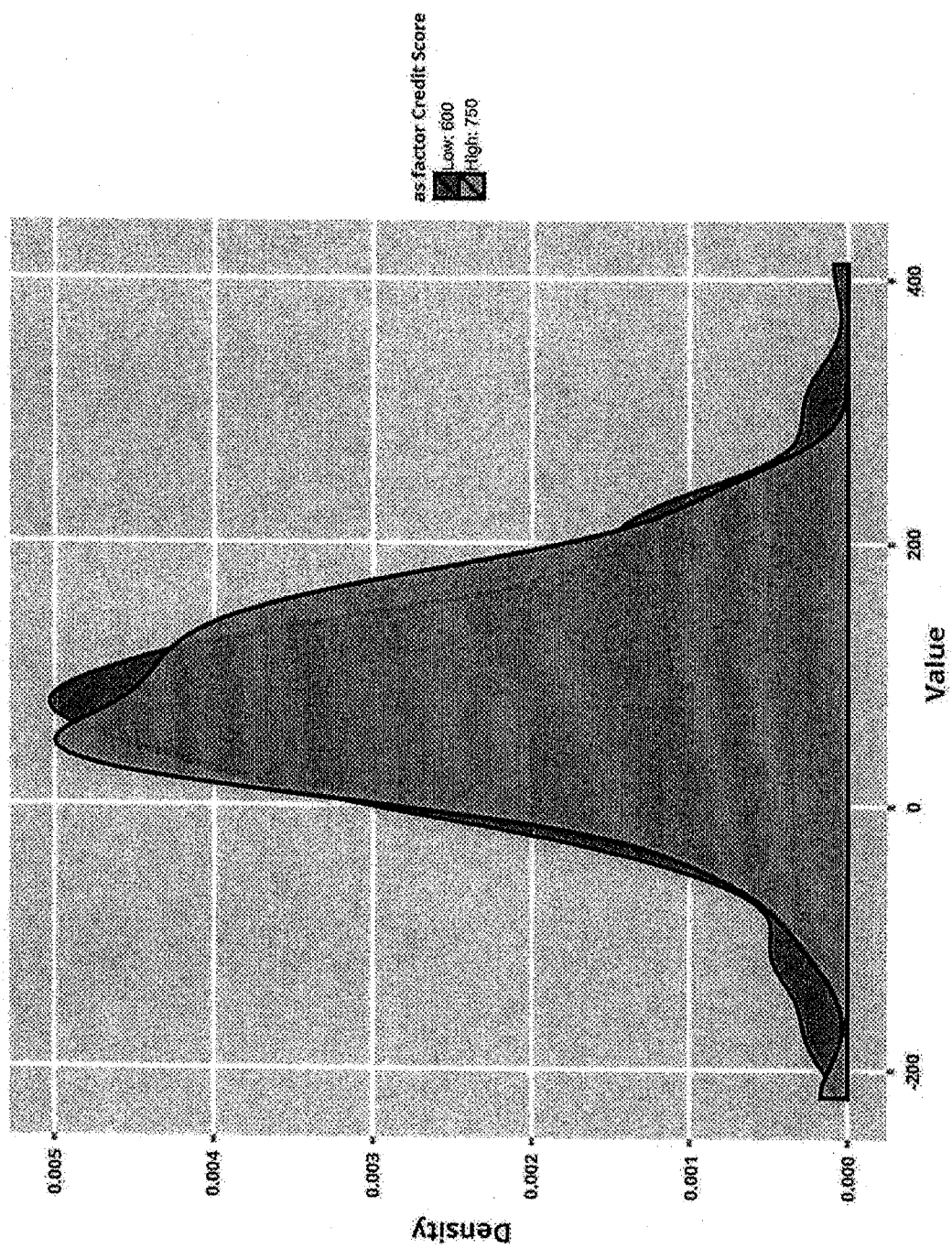
FIG. 16 illustrates the probability distribution of individually normalized scores.

FIG. 16 illustrates that the evaluated risk-reward tolerances of the users are correlated with the users' credit risk. FIG. 16 illustrates the probability distribution of individually normalized scores. There is a significant tendency for low credit score users (i.e., those with high credit risk) to have either very low or very high reward to risk tolerance. This shows that the evaluated risk-reward tolerance of the users may be used to predict the users' credit risk.

Because the evaluated plurality of psychological traits of a user is predictive of the user's credit risk, a weighted sum of the evaluated plurality of psychological traits of the user may be used as a metric for classifying the user into one of many categories, each category having a different level of predicted credit risk. The weighted sum may be determined by machine learning processes or regression (both linear and logistic) models.

In some embodiments, a credit risk score may be determined as shown below:

Predicted Credit Risk Score=Intercept+
$W_1$*HourGlassO+$W_2$*HourGlassC+
$W_3$*HourGlassE+$W_4$*HourGlassA+
$W_5$*HourGlassN+
$W_6$*RiskRewardComputedScore+
$W_7$*SpendingCurveSelection where Wn=regression determined weighting value for the particular attribute (e.g. HourGlassE)
HourGlassO=score corresponding to the hourglass related to openness
HourGlasssC=score corresponding to the hourglass related to conscientiousness
HourGlassE=score corresponding to the hourglass related to extraversion
HourGlassA=score corresponding to the hourglass related to agreeableness
HourGlassN=score corresponding to the hourglass related to neuroticism
RiskRewardComputedScore=score corresponding to the risk-reward curves
SpendingCurveSelection=score corresponding to the spending curves Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, executed by a processor, for obtaining psychometric information about a user, comprising:
providing a graphical interface on a user device to the user, the graphical interface including a psychometric graphical object provided by a personalized user management module executed by the processor, wherein at least a first wider portion of the psychometric graphical object is labeled with a first keyword related to a psychological trait, and wherein at least a second wider portion of the psychometric graphical object is labeled with a second keyword related to the psychological trait;
receiving user interaction with the psychometric graphical object in the graphical interface from the user device, the user interaction comprising one or more of clicking on a portion of the psychometric graphical object, dragging on a portion of the psychometric graphical object, selecting the psychometric graphical object, and hovering over a certain area of the psychometric graphical object with a mouse or other pointing device;
measuring the user interaction with the psychometric graphical object by a psychological traits evaluation module executed by the processor, the measured user interaction including one or more of a location of the portion of the psychometric graphical object that the user interacts with, how long the user takes to select the particular psychometric graphical object, and how long the pointing device hovers over the certain area of the psychometric graphical object;
storing the measured user interaction with the psychometric graphical object into a database; and
wherein the psychometric graphical object measures the user interaction on a continuous scale of choices provided by a shape of the psychometric graphical object that improves visualization, and wherein the measured user interaction with the psychometric graphical object corresponds to at least one discrete choice along the continuous scale of choices for at least one question to shorten evaluation time of a questionnaire regarding the psychological trait associated with the user.

2. The method of claim 1, wherein
each of the first keyword and the second keyword describes the psychological trait; and
the first keyword is dissimilar to the second keyword.

3. The method of claim 1, wherein
the psychological trait comprises a personality trait.

4. The method of claim 3, wherein
the personality trait comprises a Big Five personality trait.

5. The method of claim 1, wherein
the psychometric graphical object further includes a feature between the first wider portion and the second wider portion; and
the feature between the first wider portion and the second wider portion facilitates improved visualization of the psychometric graphical object.

6. The method of claim 5, wherein
the feature comprises a shading that is different from a shading of the first wider portion and a shading of the second wider portion.

7. The method of claim 1, wherein
the psychometric graphical object further includes a narrower portion that is between the first wider portion and the second wider portion.

8. The method of claim 1, wherein
the psychometric graphical object comprises an hourglass shape providing for X-axis and Y-axis motion in the mouse or other pointing device in the user interaction along the psychometric graphical object;
the first wider portion of the psychometric graphical object comprises a first base of the hourglass shape; and
the second wider portion of the psychometric graphical object comprises a second base of the hourglass shape.

9. The method of claim 1, wherein
the psychometric graphical object comprises a shape that is symmetrical along an x-axis and a y-axis of the graphical interface.

10. The method of claim 1, wherein measuring user interaction with the psychometric graphical objects comprises
measuring the location of where the user clicks on the psychometric graphical object with the mouse or the pointing device in the graphical interface.

11. The method of claim 10, wherein the measuring of the location comprises
measuring at a pixel level in the graphical interface the location of where the user clicks on the psychometric graphical object with the mouse or the pointing device.

12. A system for obtaining psychometric information about a user, comprising:
a personalized user management module executed by a processor configured to provide a graphical interface on a user device to the user, the graphical interface including a psychometric graphical object to the user, wherein at least a first wider portion of the psychometric graphical object is labeled with a first keyword related to a psychological trait, and wherein at least a second wider portion of the psychometric graphical object is labeled with a second keyword related to the psychological trait;
a psychological traits evaluation module executed by the processor configured to receive user interaction with the psychometric graphical object in the graphical interface from the user device, the user interaction comprising one or more of clicking on a portion of the psychometric graphical object, dragging on a portion of the psychometric graphical object, selecting the psychometric graphical object, and hovering over a certain area of the psychometric graphical object with a mouse or other pointing device, the psychological traits evaluation module executed by the processor configured to measure the user interaction with the psychometric graphical object, the measured user interaction including one or more of a location of the portion of the psychometric graphical object that the user interacts with, how long the user takes to select the particular psychometric graphical object, and how long the pointing device hovers over the certain area of the psychometric graphical object;
a database in communication with the processor to store the measured user interaction with the psychometric graphical object; and
wherein the psychometric graphical object measures the user interaction on a continuous scale of choices provided by a shape of the psychometric graphical object that improves visualization, and wherein the measured user interaction with the psychometric graphical object corresponds to at least one discrete choice along the continuous scale of choices for at least one question to shorten evaluation time of a questionnaire regarding the psychological trait associated with the user.

13. The system of claim 12, wherein
each of the first keyword and the second keyword describes the psychological trait; and
the first keyword is dissimilar to the second keyword.

14. The system of claim 12, wherein
the psychological trait comprises a personality trait.

15. The system of claim 14, wherein
the personality trait comprises a Big Five personality trait.

16. The system of claim 12, wherein
the psychometric graphical object further includes a feature between the first wider portion; and
the feature between the first wider portion and the second wider portion facilitates visualization of the psychometric graphical object.

17. The system of claim 16, wherein
the feature comprises a shading that is different from a shading of the first wider portion and a shading of the second wider portion.

18. The system of claim 12, wherein
the psychometric graphical object further includes a narrower portion that is between the first wider portion and the second wider portion.

19. The system of claim 12, wherein
the psychometric graphical object comprises an hourglass shape providing for X-axis and Y-axis motion in the mouse or other pointing device in the user interaction along the psychometric graphical object;
the first wider portion of the psychometric graphical object comprises a first base of the hourglass shape; and
the second wider portion of the psychometric graphical object comprises a second base of the hourglass shape.

20. The system of claim 12, wherein
the psychometric graphical object comprises a shape that is symmetrical along an x-axis and a y-axis.

21. The system of claim 12, wherein measuring user interaction with the psychometric graphical objects comprises
measuring the location of where the user clicks on the psychometric graphical object with the mouse or the pointing device in the graphical interface.

22. The system of claim 21, wherein the measuring of the location comprises
measuring at a pixel level in the graphical interface the location of where the user clicks on the psychometric graphical object with the mouse or the pointing device.

23. A computer program product for obtaining psychometric information about a user, the computer program product being embodied in a non-transitory computer readable storage medium and comprising computer instructions for:
providing a graphical interface on a user device to the user, the graphical interface including a psychometric graphical object to the user by a personalized user management module executed by a processor, wherein at least a first wider portion of the psychometric graphical object is labeled with a first keyword related to a psychological trait, and wherein at least a second wider portion of the psychometric graphical object is labeled with a second keyword related to the psychological trait;

receiving user interaction with the psychometric graphical object in the graphical interface from the user device, the user interaction comprising one or more of clicking on a portion of the psychometric graphical object, dragging on a portion of the psychometric graphical object, selecting the psychometric graphical object, and hovering over a certain area of the psychometric graphical object with a mouse or other pointing device;

measuring the user interaction with the psychometric graphical object by a psychological traits evaluation module executed by the processor, the measured user interaction including one or more of a location of the portion of the psychometric graphical object that the user interacts with, how long the user takes to select the particular psychometric graphical object, and how long the pointing device hovers over the certain area of the psychometric graphical object;

storing the measured user interaction with the psychometric graphical object into a database; and wherein the psychometric graphical object measures the user interaction on a continuous scale of choices provided by a shape of the psychometric graphical object that improves visualization, and wherein the measured user interaction with the psychometric graphical object corresponds to at least one discrete choice along the continuous scale of choices for at least one question to shorten evaluation time of a questionnaire regarding the psychological trait associated with the user.

* * * * *